(12) United States Patent
Ikeda et al.

(10) Patent No.: US 11,233,950 B2
(45) Date of Patent: Jan. 25, 2022

(54) ELECTRONIC DEVICE, IMAGING DEVICE, AND IMAGING APPARATUS

(71) Applicant: Ricoh Company, Ltd., Tokyo (JP)

(72) Inventors: Atsushi Ikeda, Ebina (JP); Kenji Hayasaka, Ebina (JP); Takamasa Matsumoto, Ebina (JP); Youhei Niitsuma, Ebina (JP); Toshihiro Okamoto, Kanagawa (JP); Kenta Takahashi, Ebina (JP); Yuichi Mikuni, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/944,525

(22) Filed: Jul. 31, 2020

(65) Prior Publication Data

US 2021/0127047 A1    Apr. 29, 2021

(30) Foreign Application Priority Data

Oct. 23, 2019   (JP) .............................. JP2019-192679

(51) Int. Cl.
    *H04N 5/235*    (2006.01)
    *G03B 19/04*    (2021.01)
    *G03B 7/10*     (2021.01)
    *G03B 7/26*     (2021.01)

(52) U.S. Cl.
    CPC ............ *H04N 5/2353* (2013.01); *G03B 7/10* (2013.01); *G03B 7/26* (2013.01); *G03B 19/04* (2013.01); *G03B 2219/045* (2013.01)

(58) Field of Classification Search
    CPC ........ G03B 17/02; G03B 17/14; G03B 17/00; G03B 17/26; G03B 19/04; H04N 5/2254; H04N 5/2353

USPC .................................... 396/429, 511; 348/64
See application file for complete search history.

(56) References Cited

U.S. PATENT DOCUMENTS

| | | | | |
|---|---|---|---|---|
| 6,351,282 B1 * | 2/2002 | DeLeeuw | ............ | H04N 1/2112 348/231.99 |
| 6,370,339 B1 * | 4/2002 | Stern | .................... | H04N 5/2254 396/429 |
| 6,943,820 B2 * | 9/2005 | Schmidt | ................. | H04N 5/225 348/64 |
| 7,676,151 B2 * | 3/2010 | Misawa | ................. | G03B 19/04 396/429 |

(Continued)

FOREIGN PATENT DOCUMENTS

| | | |
|---|---|---|
| JP | 2012-242614 | 12/2012 |
| JP | 2012-242615 | 12/2012 |

*Primary Examiner* — Christopher E Mahoney
(74) *Attorney, Agent, or Firm* — Xsensus LLP

(57) ABSTRACT

An electronic device includes an open-close detector configured to detect an open-close state indicating whether an optical path open-close device of a film camera is open or closed, a displacement detector configured to detect a displacement of a movable portion of the film camera interlocked with a movement of an operation portion of the film camera, and control circuitry. In response to a detection result of the displacement detector, the control circuitry selects a measurement mode for measuring an open time during which the optical path open-close device is open, from a plurality of operation modes of the electronic device. In the measurement mode, the control circuitry measures the open time based on the open-close state detected by the open-close detector.

17 Claims, 14 Drawing Sheets

(56) References Cited

U.S. PATENT DOCUMENTS

| 7,773,114 B2* | 8/2010 | Georgis | H04N 5/2253 |
| | | | 348/207.99 |
| 2006/0197014 A1* | 9/2006 | Inuiya | G03B 17/26 |
| | | | 250/239 |

* cited by examiner

ELECTRONIC DEVICE, IMAGING DEVICE, AND IMAGING APPARATUS

CROSS-REFERENCE TO RELATED APPLICATION

This patent application is based on and claims priority pursuant to 35 U.S.C. § 119(a) to Japanese Patent Application No. 2019-192679, filed on Oct. 23, 2019, in the Japan Patent Office, the entire disclosure of which is hereby incorporated by reference herein.

BACKGROUND

Technical Field

The present disclosure relates to an electronic device, an imaging device, and an imaging apparatus.

Related Art

Conventionally, there is an electronic camera back mounted on a camera body of a film camera. For example, such an electronic camera back includes an image sensor to capture a subject image, an operation portion, and a switching unit for switching between a first mode and a second mode.

In the first mode, the image sensor starts charge storage when the operation portion is operated, and the image sensor ends the charge storage when the operation portion is operated again after the charge storage is started.

In the second mode, the image sensor starts charge storage when the operation portion is operated, continues the charge storage while the operation portion is operated, and ends the charge storage when the operation portion is no longer operated.

SUMMARY

According to an embodiment of this disclosure, an electronic device includes an open-close detector configured to detect an open-close state indicating whether an optical path open-close device of a film camera is open or closed, a displacement detector configured to detect a displacement of a movable portion of the film camera, and control circuitry. The movable portion is interlocked with a movement of an operation portion of the film camera. In response to a detection result generated by the displacement detector, the control circuitry selects a measurement mode for measuring an open time during which the optical path open-close device is open, from a plurality of operation modes of the electronic device. In the measurement mode, the control circuitry measures the open time based on the open-close state detected by the open-close detector.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
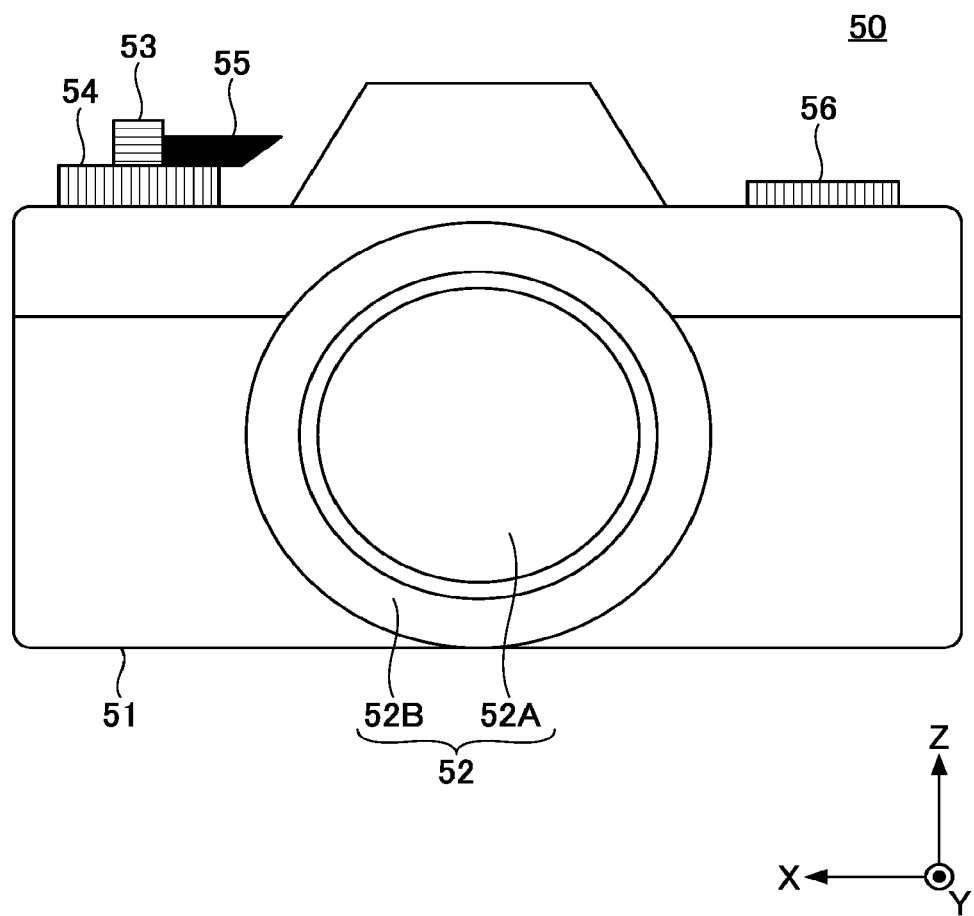
FIG. 1 is a front view of a camera according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, embodiments of this disclosure are described. As used herein, the singular forms "a," "an," and "the" are intended to include the plural forms as well, unless the context clearly indicates otherwise.

Figure 2:
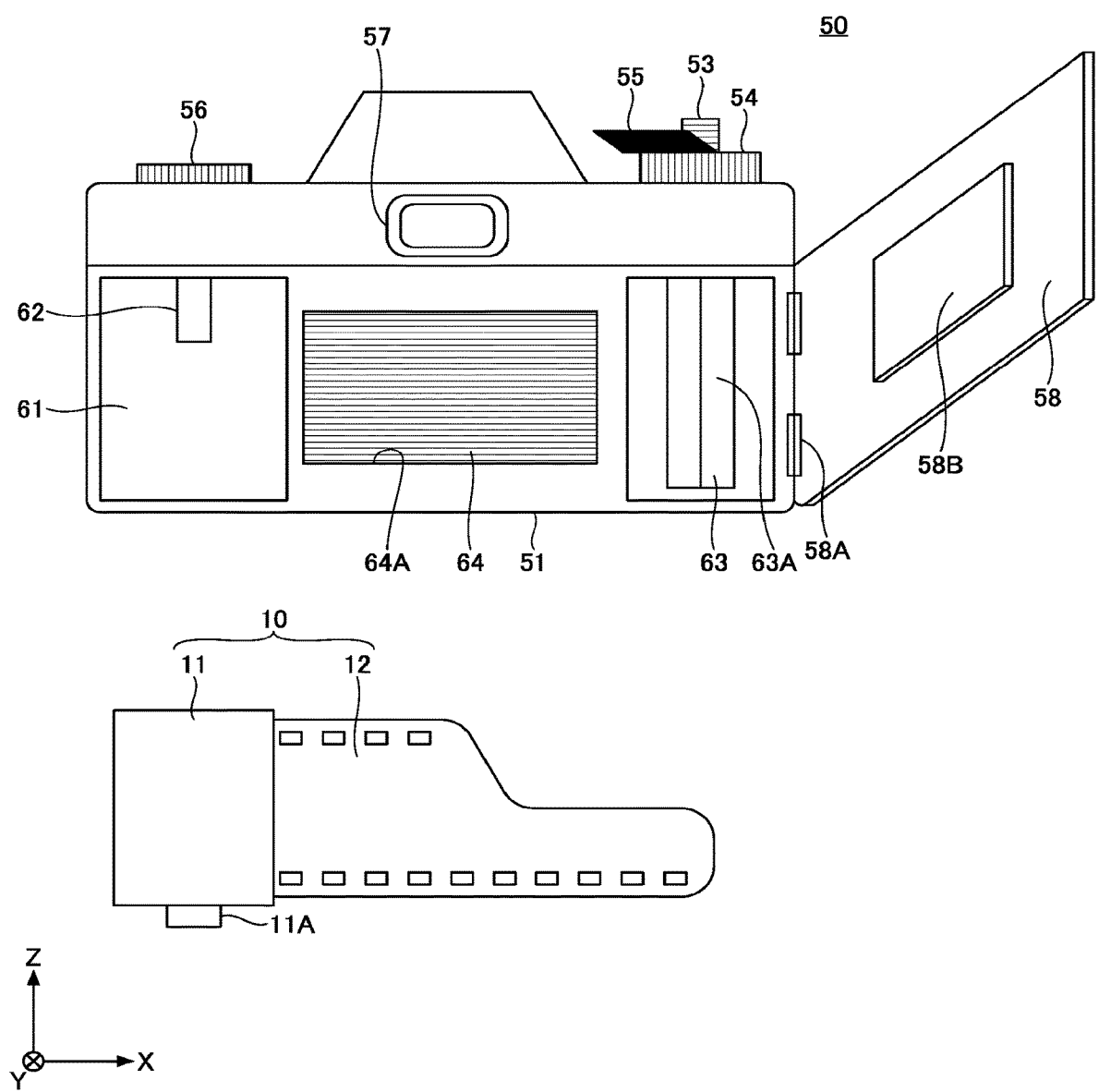
FIG. 2 is a rear view illustrating the camera.

FIG. 1 is a front view illustrating a camera 50 according to the present embodiment. FIG. 2 is a rear view illustrating the camera 50. FIG. 2 illustrates the camera 50 and a film cartridge 10 to be loaded therein. The film cartridge 10 includes a cartridge 11 and a film 12.

In the description below, as illustrated in the drawings, an XYZ orthogonal coordinate system which is a rectangular coordinate system is defined. For convenience of description, the plus (+) side in the Z direction is referred to as the upper side, the minus (−) side in the Z direction is referred to as the lower side, the plus (+) side in the Y direction is referred to as the front side, and the minus (−) side in the Z direction is referred to as the rear side. Further, the X direction is a horizontal direction while the Z direction is a vertical direction. However, such references do not signify a universal top-bottom relationship, front-rear relationships, and vertical-horizontal relationships.

The camera 50 is a silver-salt camera (a film camera) and, for example, a single-lens reflex camera that uses a 35-mm film 12. However, the camera 50 can be any silver-salt camera including a mechanical shutter. The camera 50 is not limited to a single-lens reflex camera, and the film 12 is not limited to a 35-mm film. The mechanical shutter, such as a focal plane shutter or a Compur shutter, includes a mechanical component that opens and closes. Any mechanical shutter can be used as long as the shutter includes a light-shielding curtain (or a light-shielding blade) that opens and closes an opening through which light passes (an optical path open-close device).

The camera 50 includes, as main components, a camera body 51, a lens 52 (a lens group 52A and a lens barrel 52B), a shutter button 53, a shutter speed dial 54, a film advance lever 55, a rewinding operation portion 56, a viewfinder 57, and a rear lid 58.

Inside the camera body 51, the camera 50 includes a cartridge chamber 61, a rewinding fork 62, a spool 63, a shutter curtain 64, and a shutter opening 64A. These components are visible when the rear lid 58 is open as illustrated in FIG. 2.

The camera body 51 is a portion of a housing of the camera 50. In a state where the lens 52 is attached thereto and the rear lid 58 is closed, the camera body 51 is optically sealed to protect the film 12 from light except when the film 12 is exposed. The camera body 51 constructs the housing of the camera 50 together with the rear lid 58.

The lens 52 includes the lens group 52A and the lens barrel 52B. The plurality of optical lenses included in the lens group 52A are held at positions optically determined by the lens barrel 52B, and the lens barrel 52B is mounted on the plus side in the Y direction of the camera body 51. The side on which the lens barrel 52B is mounted is the front side of the camera 50. The lens barrel 52B includes an aperture adjustment mechanism that adjusts the aperture (f-number) and a focus adjustment mechanism that adjusts the focus. The lens barrel 52B can further include a zoom function or the like.

The shutter button 53 is a button used to open and close the shutter curtain 64. The shutter button 53 is disposed on the upper face of the camera body 51 on the right side when the camera 50 is viewed from the rear side (see FIG. 2). When the shutter button 53 is pushed down, the shutter curtain 64 runs at a shutter speed set by the shutter speed dial 54. The exposure time of the film 12 is determined by the shutter speed.

The shutter speed dial 54 is disposed on the upper face of the camera body 51 and around the shutter button 53. The shutter speed dial 54 is rotated to set the shutter speed to a desired shutter speed.

The film advance lever 55 is an example of a winding operation portion for winding a film. The film advance lever 55 is disposed on the upper face of the camera body 51, beside the shutter speed dial 54, and is coupled to the spool 63. Each time the film advance lever 55 is wound up, the film 12 winding around the spool 63 is wound up by the amount equivalent to one frame.

The rewinding operation portion 56 is an example of an operation portion that is operated from the outside of the camera body 51. The rewinding operation portion 56 is disposed on the upper face of the camera body 51 on the left side when the camera 50 is viewed from the rear side (see FIG. 2). The rewinding operation portion 56 is coupled to the rewinding fork 62 in the cartridge chamber 61.

When the rewinding operation portion 56 is pulled up, the rewinding fork 62 is pulled up inside the cartridge chamber 61 (from the state illustrated in FIG. 2), and the cartridge chamber 61 is ready to accommodate the cartridge 11.

When the rewinding operation portion 56 is rewound after the photographing by the camera 50 is finished, the rewinding fork 62 winds, into the cartridge 11, the film 12 from the spool 63.

In this specification, the cartridge 11 is a substantially cylindrical container capable of accommodating the film 12 in a wound state, and a combination of the cartridge 11 and the film 12 is the film cartridge 10.

The viewfinder 57 is disposed at a center in an upper part on the rear side (see FIG. 2) of the camera body 51. The viewfinder 57 is for confirming a subject through the lens 52.

The rear lid 58 is provided to open and close the rear side (see FIG. 2) of the camera body 51 substantially entirely. The rear lid 58 is hinged to the camera body 51 via a hinge 58A. On the inner face of the rear lid 58 (the face on the plus side in the Y direction when the rear lid 58 is closed), a pressure plate 58B is disposed. The pressure plate 58B presses the film 12 in front of the shutter opening 64A.

Although the film cartridge 10 is not loaded in the camera 50 in FIG. 2, the film cartridge 10 can be loaded in the camera 50 or unloaded therefrom with the rear lid 58 opened. As illustrated in FIG. 2, when the rear lid 58 is opened, the rear sides of all of the cartridge chamber 61, the rewinding fork 62, the spool 63, the shutter curtain 64, and the shutter opening 64A are open.

The cartridge chamber 61 is a space for accommodating the cartridge 11, and a lower end of the rewinding fork 62 projects down from the upper side into the cartridge chamber 61. The cartridge 11 is loaded therein in a state in which the rewinding operation portion 56 is pulled up, and the rewinding fork 62 is pulled up inside the cartridge chamber 61 (from the state illustrated in FIG. 2). When the rewinding operation portion 56 is pushed down in this state, the rewinding fork 62 is inserted into a recess of a spool (shaft) 11A of the cartridge 11.

The rewinding fork 62 is an example of a movable portion that is interlocked with the movement of the rewinding operation portion 56 (predetermined operation portion) that is operated from the outside of the camera body 51. The rewinding fork 62 is coupled to the rewinding operation portion 56 through a through hole in the upper face of the camera body 51.

The rewinding fork 62 is rotatable about the Z axis and movable in the Z axis direction in accordance with the operation of the rewinding operation portion 56. The rewinding fork 62 is rotated when the film 12 is rewound inside the cartridge 11 after the camera 50 has finished photographing with the film 12.

The spool 63 is coupled to the film advance lever 55 through a through hole in the upper face of the camera body 51. The winding shaft 63A of the spool 63 is a rod-shaped portion that winds the film 12, and has a slit into which a leading end (leader portion) of the film 12 wound in the cartridge 11 is inserted.

When the film 12 is pulled out from the cartridge 11 loaded in the cartridge chamber 61 and the leading end (leader portion) of the film 12 is inserted into the slit of the spool 63, the film 12 moves to a position overlapping the shutter curtain 64. When the film advance lever 55 is wound up in a state where the leading end portion (leader portion) of the film 12 is inserted in the slit of the spool 63, the film 12 is wound by the spool 63 one frame at a time.

The shutter curtain 64 is an example of a mechanical shutter, and is located on the rear side (minus side in the Y direction) of the shutter opening 64A. The shutter opening 64A is located substantially at a center of the camera body 51 in the lateral direction with the rear lid 58 opened.

The shutter curtain 64 is, for example, such a focal plane shutter that the shutter curtain 64 is moved laterally relative to the shutter opening 64A by a shutter mechanism.

The closed state of the shutter curtain 64 is the state in which the shutter curtain 64 blocks the shutter opening 64A. The open state of the shutter curtain 64 is the state where the shutter curtain 64 has moved in the lateral direction relative to the shutter opening 64A, and the shutter opening 64A does not overlap with the shutter curtain 64. The shutter curtain 64 opens and closes by moving laterally driven by the shutter mechanism.

The shutter opening 64A is located on the rear side (minus side in the Y direction) of the lens 52 (see FIG. 1). Since the film 12 is located on the rear side (minus side in the Y direction) of the shutter curtain 64, the film 12 is exposed with light entering through the lens 52 and the shutter opening 64A while the shutter curtain 64 is open.

The time during which the shutter curtain 64 is held open (open time) is the exposure time. Since the exposure time is determined by the shutter speed, the open time of the shutter curtain 64 is set by the shutter speed dial 54.

Note that, here, although description will be made using the camera 50 in which the shutter speed adjustment, the aperture (f-number) adjustment, and the focus adjustment are performed manually, aspects of the present disclosure are applicable to a film camera in which some or all of these adjustments are automated.

Figure 3:
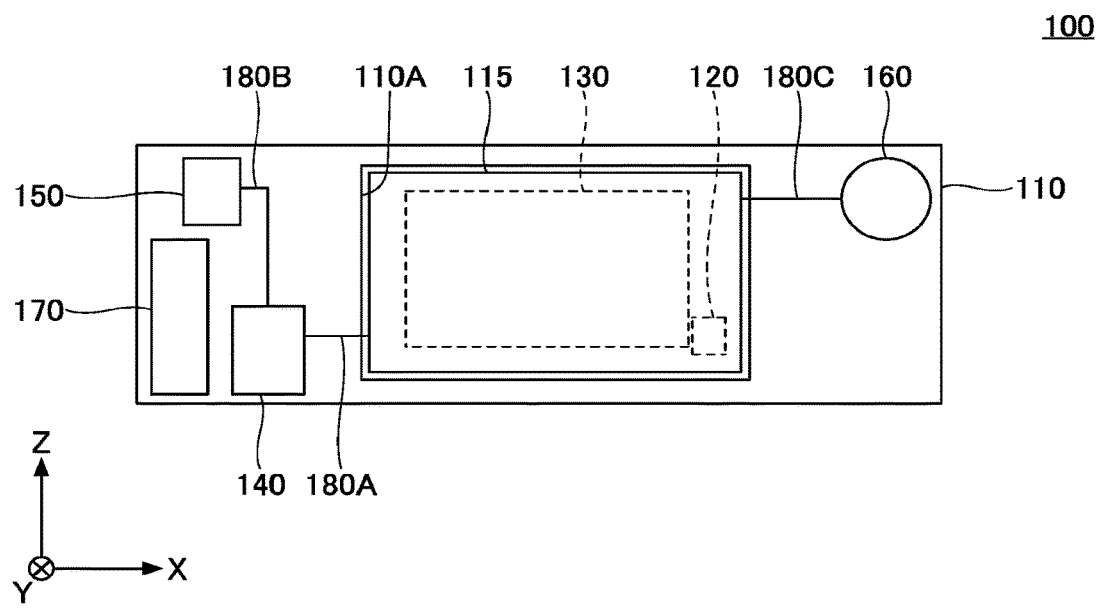
FIG. 3 is a diagram illustrating an imaging device according to an embodiment of the present disclosure.

FIG. 3 is a diagram illustrating an imaging device 100 according to the present embodiment. The imaging device 100 is housed inside the camera body 51 instead of the film cartridge 10 in a state where the rear lid 58 of the camera 50 (see FIGS. 1 and 2) is open.

When the rear lid 58 is closed in this state, the imaging device 100 is placed in the space enclosed by the camera body 51 and the rear lid 58. The space is a so-called film room in a film camera. In other words, the imaging device 100 can be disposed in such a film room. Therefore, the imaging device 100 is not visible from the outside of the camera 50. With this structure, it is undistinguishable which of the film cartridge 10 and the imaging device 100 is mounted in the camera 50.

That is, the imaging device 100 can be attached to the camera 50 without impairing the appearance of the existing camera 50. Not impairing the external appearance of the camera 50 means that the external appearance of the camera 50 does not change, and that it is not necessary to change a component of the camera or remove a component from the camera 50 in a range visible from the outside.

Note that the imaging device 100 does not require a change or removal of a component also inside the camera 50.

Hereinafter, a state in which the imaging device 100 is aligned inside the camera body 51 and the rear lid 58 is closed is referred to as a state in which the imaging device 100 is attached to the camera 50.

The imaging device 100 being attached to the camera body 51 is an example of an imaging apparatus according to an aspect of this present disclosure. When an image sensor 130 is removed from the imaging device 100, the device is an example of an electronic device according to another aspect of this present disclosure.

The imaging device 100 is a digital imaging module to acquire a digital image, without impairing the appearance of the existing camera 50. Specifically, the imaging device 100 is operated with the operation portion of the camera 50, to capture light entering the camera 50 through the lens 52 and the shutter opening 64A. A digital image is an example of an electronic image. An electronic image is image data of electronic data.

More specifically, the imaging device 100 uses the aperture (f-number) adjusted by the aperture adjustment mechanism of the lens 52 and the shutter speed set by the shutter speed dial 54, to capture the light entering through the lens 52 and the shutter opening 64A thereby acquiring a digital image, at an image capturing timing determined by the operation of the shutter button 53.

Of the aperture (f-number), the shutter speed, and the image capturing timing that are determined by the operation of the camera 50 in this manner, the aperture (f-number) is reflected in the amount of light that enters the imaging device 100 via the lens 52 and the shutter opening 64A. Therefore, the aperture (f-number) follows the value adjusted by the aperture adjustment mechanism of the lens 52.

However, the shutter speed and the image capturing timing are not reflected by simply attaching the imaging device 100 to the camera 50.

Therefore, before capturing an image, the imaging device 100 measures the open time of the shutter curtain 64 through the operation of the camera 50. When the shutter button 53 is pressed, the imaging device 100 acquires a digital image by performing image capturing for the open time measured in advance. The imaging device 100 detects the pressing of the shutter button 53 by using a mechanism for detecting the opening/closing of the shutter curtain 64.

Therefore, the imaging device 100 measures, before capturing an image, the open time of the shutter curtain 64 and captures an image using the measured open time to acquire a digital image. Before the image capturing, the open time of the shutter curtain 64 is measured.

Hereinafter, the details of the imaging device 100 are described. In FIG. 3 and subsequent drawings, the XYZ coordinate system common to FIGS. 1 and 2 is used. The XYZ coordinate system in FIG. 3 and the subsequent drawings indicates the directions of the X-axis, Y-axis, and Z-axis in the state where the imaging device 100 is attached to the camera 50.

The imaging device 100 includes a frame 110, a wiring board 115, an open-close detector 120, an image sensor 130, a controller 140, a displacement detector 150, a sound output unit 160, a battery 170, and cables 180A, 180B, and 180C. Of these components of the imaging device 100, the open-close detector 120 and the image sensor 130 are mounted on a front side (plus side in the Y direction) of the wiring board 115.

The frame 110 is a frame of the imaging device 100 and is disposed in a space closed by the camera body 51 (see FIG. 2) and the rear lid 58. The frame 110 has an opening 110A. The wiring board 115 is fixed to the opening 110A. The open-close detector 120 and the image sensor 130 are mounted on the frame 110 via the wiring board 115.

Further, the controller 140, the displacement detector 150, the sound output unit 160, the battery 170, and the cables 180A, 180B, and 180C are directly mounted on the frame 110.

The open-close detector 120 and the image sensor 130 are connected to the controller 140 via the wiring of the wiring board 115 and the cable 180A. The displacement detector 150 is connected to the controller 140 via the cable 180B. The sound output unit 160 is connected to the wiring board 115 via the cable 180C and further connected to the controller 140 via the cable 180A.

The open-close detector 120, the image sensor 130, and the sound output unit 160 are supplied with power from the battery 170 through a power cable and the wiring of the wiring board 115. Further, the controller 140 and the displacement detector 150 are supplied with power from the battery 170 through a power cable.

The material and manufacturing method of the frame 110 are not particularly limited. For example, the frame 110 can be a resin product molded using a die or the like. A specific example of the frame 110 is described later with reference to FIG. 4.

The open-close detector 120 detects the open/close state of the shutter curtain 64, that is, whether the shutter curtain 64 is open or closed. As the open-close detector 120, for example, a photo diode (PD) can be used.

The open-close detector 120 is mounted on the front side (plus side in the Y direction) of the wiring board 115. The open-close detector 120 is mounted via the wiring board 115 on the frame 110 so that the open-close detector 120 faces the front side (plus side in the Y direction) at a position offset from a lateral center of the frame 110 to the plus side in the X direction. Alternatively, the open-close detector 120 can be disposed on the front side face (plus side in the Y direction) of the frame 110, not via the wiring board 115.

The open-close detector 120 is disposed at a position overlapping the shutter opening 64A in the X-Z plan view when the imaging device 100 is attached to the camera 50. More specifically, the open-close detector 120 is disposed at an end of the shutter opening 64A (a rectangular area) in the X-Z plan view when the imaging device 100 is attached to the camera 50. This is to detect the light incident in the shutter opening 64A while avoiding the image sensor 130 positioned at the center of the shutter opening 64A in the X-Z plane view.

The open-close detector 120 does not output an electrical current when the shutter curtain 64 is closed. When the shutter curtain 64 is open, the open-close detector 120 performs optical-electrical conversion with the light incident through the lens 52 and the shutter opening 64A, thereby outputting an electrical current. A signal representing the detection result of the open-close detector 120 is input to the controller 140 via the wiring of the wiring board 115 and the cable 180A.

The image sensor 130 is an example of an image capturing unit, and is an imaging element (so-called an optical-electrical conversion element) that performs photoelectric conversion using a charge-coupled device (CCD) or a complementary metal oxide semiconductor (CMOS).

The image sensor 130 is mounted on the front face (plus side in the Y direction) of the wiring board 115. The image sensor 130 is disposed in a central portion of the frame 110 in the lateral direction and mounted via the wiring board 115 on the frame 110. In the state where the imaging device 100 is attached to the camera 50, the image sensor 130 is inside the opening area of the shutter opening 64A and faces the front side (plus side in the Y direction).

Alternatively, the image sensor 130 can be disposed on the front face (plus side in the Y direction) of the frame 110. When the open-close detector 120 and the image sensor 130 are disposed on the front face (plus side in the Y direction) of the frame 110, the imaging device 100 does not need to include the wiring board 115.

When the shutter curtain 64 is open, the image sensor 130 receives light reflected from the subject and entering through the lens 52 and the shutter opening 64A and acquires a digital image of the subject. Receiving an image capturing command from the controller 140, the image sensor 130 operates the electronic shutter for the exposure time set by the controller 140 to receive the reflected light from the subject to acquire a digital image, and output the digital image data is to the controller 140. In response to a detection by the open-close detector 120 that the shutter curtain 64 is open, the controller 140 outputs an image capturing command to the image sensor 130.

The controller 140 is an example of control circuitry, and is a microcomputer including a central processing unit (CPU), a read only memory (ROM), a random access memory (RAM), and a nonvolatile memory.

For example, the controller 140 is disposed on the minus side of the frame 110 in the X direction, and is disposed in the cartridge chamber 61 when the imaging device 100 is attached to the camera 50.

The controller 140 switches the operation mode of the imaging device 100 between a measurement mode for measuring the open time during which the shutter curtain 64 is kept open and an image capturing mode to cause the image sensor 130 to acquire a digital image with the measured open time set as the exposure time.

The configuration of the controller 140 is described in detail later with reference to FIGS. 10 and 11. The operation of the controller 140 is described in detail later with reference to FIGS. 12 to 14.

For example, the displacement detector 150 is disposed in an upper portion of the minus side of the frame 110 in the X direction, and is disposed in the cartridge chamber 61 when the imaging device 100 is attached to the camera 50. Since the cartridge chamber 61 is widest in the internal space of the camera 50 that is closed by the camera body 51 and the rear lid 58, the displacement detector 150 can be easily placed therein.

The displacement detector 150 detects a vertical displacement of the rewinding fork 62. More specifically, the displacement detector 150 detects whether the rewinding fork 62 is at the upper end or the lower end in a vertical movement range thereof. Here, the term "displacement" signifies a rigid body displacement in continuum mechanics. That is, a displacement includes a parallel motion and a rotation of an object.

In order to position the rewinding fork 62 at the upper end of the movement range, the rewinding operation portion 56 is pulled up (pulled out) to the highest position. In order to position the rewinding fork 62 at the lower end of the movement range, the rewinding operation portion 56 is pushed down as much as possible.

The displacement of the rewinding fork 62 is detected with the displacement detector 150, and the rewinding fork 62 can be used as an operation portion for selecting the mode.

Although, in the description here, the displacement detector 150 detects whether the rewinding fork 62 is at the upper end or the lower end of the movement, alternatively, the displacement detector 150 can be configure to detect whether the rewinding fork 62 is in an upper range including the upper end or a lower range including the lower end. The upper end is an example of the first side, and the lower end is an example of the second side.

As the displacement detector 150, for example, a reflection photointerrupter can be used. The displacement detector 150 as a reflection photointerrupter emits light toward the rewinding fork 62 and detects a displacement of the rewinding fork 62 based on a change in the state of receiving of the reflected light due to the positional change of the rewinding fork 62. The configuration of the displacement detector 150 being such a reflection photointerrupter is described in detail later with reference to FIGS. 9A and 9B.

In the imaging device 100, mode switching is performed with the rewinding operation portion 56. The imaging device 100 enters the measurement mode for measuring the open time of the shutter curtain 64 in response to pulling-up of the rewinding operation portion 56, and enters the image capturing mode for causing the image sensor 130 to acquire a digital image in response to pushed-in of the rewinding operation portion 56 into the camera body 51.

In the imaging device 100, the displacement detector 150 is disposed near the rewinding fork 62 in order to detect a state where the rewinding operation portion 56 is at the highest position and a state where the rewinding operation portion 56 is fully pushed into the camera body 51 as illustrated in FIG. 2.

Since the displacement detector 150 detects the vertical displacement of the rewinding fork 62, the measurement mode and the image capturing mode can be switched depending on the vertical position of the rewinding operation portion 56. A user can visually distinguish whether the rewinding operation portion 56 is pulled up or the rewinding operation portion 56 is pushed into the camera body 51. Therefore, the user can visually confirm whether the imaging device 100 is in the measurement mode or the image capturing mode.

The sound output unit 160 is an example of a mode information output device. For example, the sound output unit 160 is disposed on the minus side face in the Y direction of an upper portion on the plus side in the X direction of the frame 110. Controlled by the controller 140, the sound output unit 160 intermittently outputs a beep sound while the imaging device 100 is in the measurement mode. When the measurement mode ends, the sound output unit 160 stops outputting the beep sound. The beep sound is an example of a confirmation sound.

As one example, the sound output unit 160 repeatedly outputs (sounds) a beep sound at 1-second intervals while the imaging device 100 is in the measurement mode. The volume of the beep sound is set to be sufficiently audible outside the camera body 51. The sound output unit 160 serves as a notification device since the sound output unit 160 performs notification to the user with the confirmation sound.

The frame 110 including a frame base 111 and a support part 112 is present on both side (in the X direction) of the image sensor 130, and the sound output unit 160 is in a region of the frame 110 on the side opposite the support part 112 (plus side in the X direction relative to the image sensor 130).

The user of the camera 50 mounted with the imaging device 100 can recognize that the imaging device 100 is in the measurement mode with the beep sound. Therefore, when the beep sound ends, the user can switch the imaging device 100 to the image capturing mode by operating the rewinding operation portion 56.

When the imaging device 100 is attached to the camera 50, the imaging device 100 is not visible from outside the camera 50, but the beep sound is transmitted to the outside of the camera 50. Therefore, based on the beep sound, the user can recognize whether or not the measurement mode is selected.

The battery 170 is a power source for the open-close detector 120, the image sensor 130, the controller 140, the displacement detector 150, and the sound output unit 160. The battery 170 is disposed, for example, on the minus side of the frame 110 in the X direction, and is disposed in the cartridge chamber 61 when the imaging device 100 is attached to the camera 50. As the battery 170, for example, a rechargeable secondary battery can be used.

The imaging device 100 includes a power switch for switching the power on and off. The user of the imaging device 100 can turn on the power before attaching the imaging device 100 to the camera 50.

Figure 4:
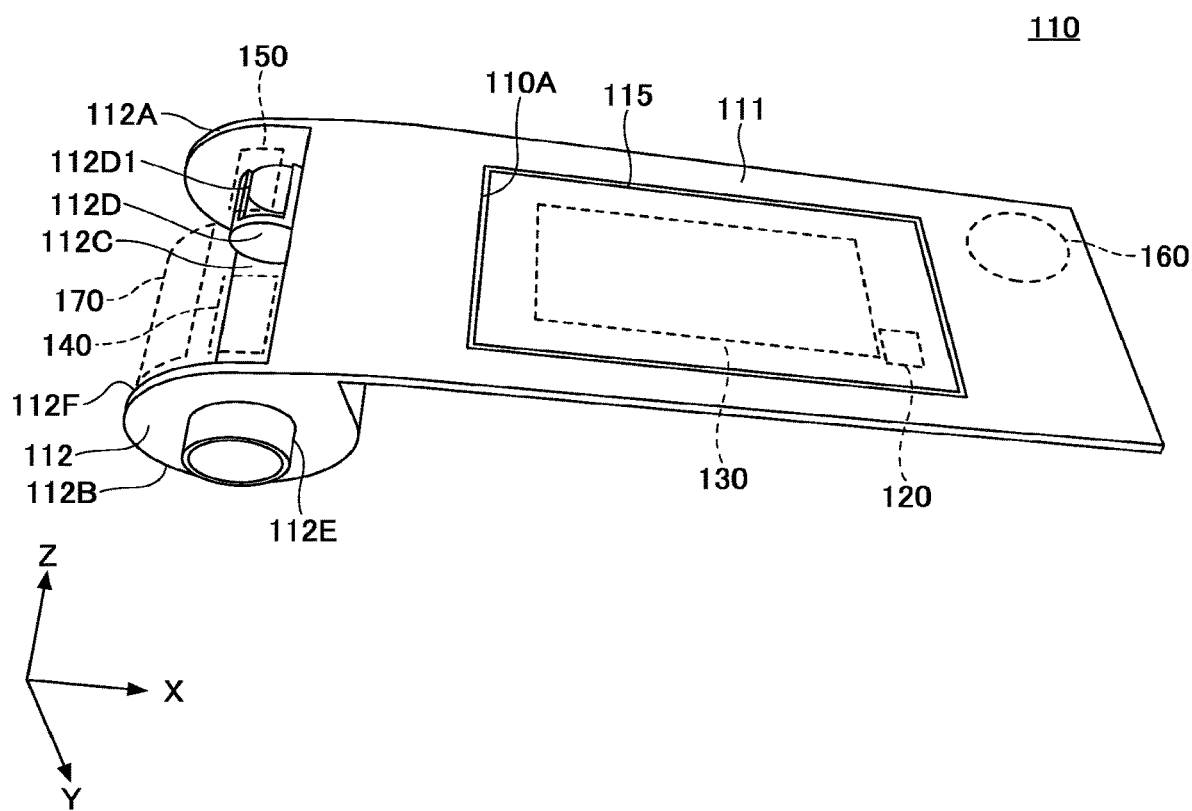
FIG. 4 is a view of an example configuration of a frame of the imaging device illustrated in FIG. 3.
Figure 5:
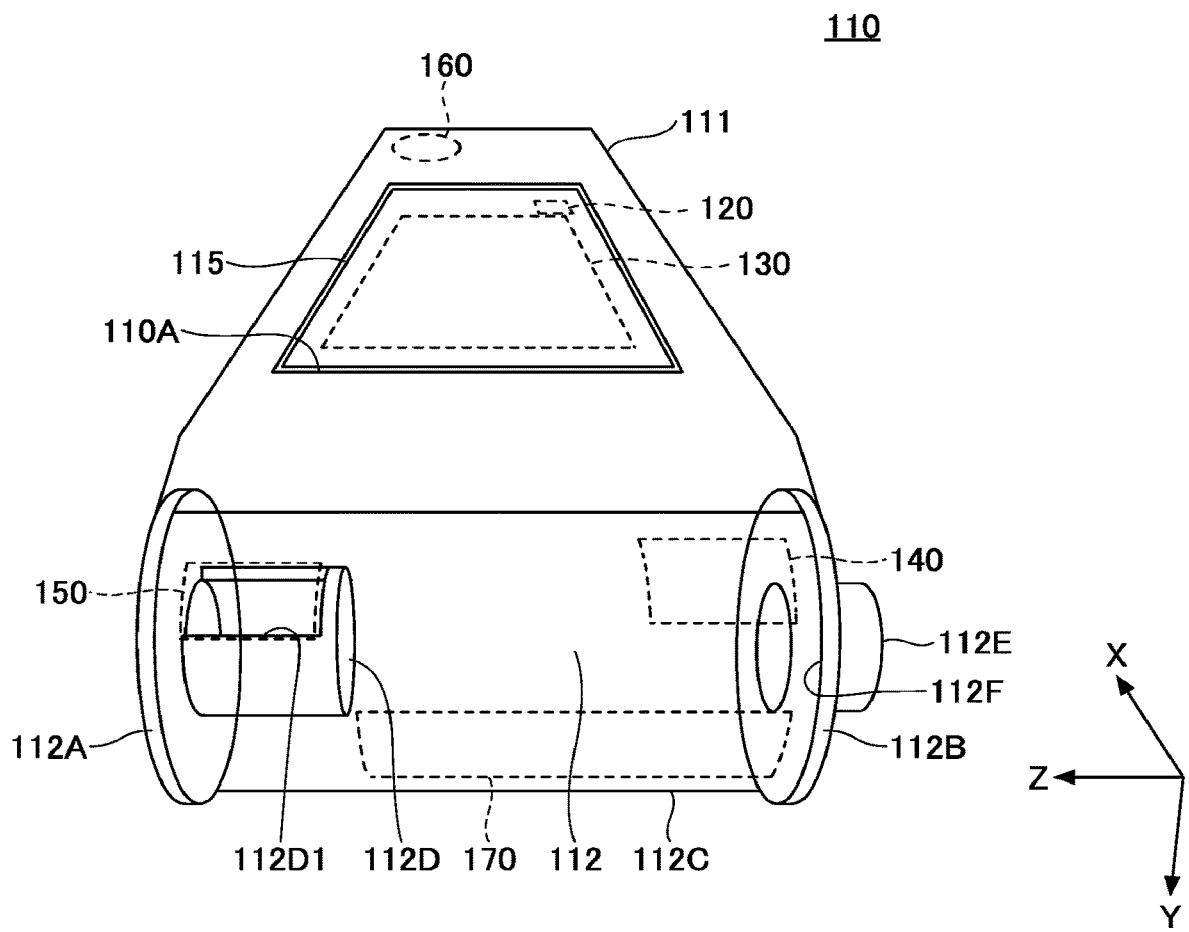
FIG. 5 is another view of the example configuration of the frame illustrated in FIG. 4.

FIGS. 4 and 5 illustrate an example configuration of the frame 110. In FIGS. 4 and 5, the wiring board 115 is illustrated by a solid line, and the positions of the open-close detector 120, the image sensor 130, the controller 140, the displacement detector 150, the sound output unit 160, and the battery 170 are illustrated by broken lines. In FIGS. 4 and 5, the cables 180A, 180B, and 180C are omitted for simplicity.

The frame 110 includes the frame base 111 and the support part 112. The frame 110 is an example of a frame of an electronic device, the frame base 111 is an example of a first part of the frame, and the support part 112 is an example of a second part of the frame. The frame 110 further includes an opening 110A that is a through-hole in the frame base 111 in the Y direction.

The frame base 111 is a flat and plate-shaped. In the state where the imaging device 100 is attached to the camera 50, the frame base 111 is housed in a space between the shutter curtain 64 and the pressure plate 58B of the rear lid 58 illustrated in FIG. 2. In the lateral direction, the frame base 111 extends to the plus side in the X direction on which the spool 63 is disposed. In this way, the frame base 111 is disposed between the portion of the camera body 51 illustrated in FIG. 2 where the shutter opening 64A and the spool 63 are located and the rear lid 58.

The wiring board 115 is fitted to and secured in the opening 110A of the frame base 111, and the open-close detector 120 and the image sensor 130 are mounted on the wiring board 115. The wiring board 115 can be fixed to the frame 110 by adhesion or the like.

Providing the opening 110A in the frame base 111 and fitting therein the wiring board 115 on which the open-close detector 120 and the image sensor 130 are mounted is advantageous in reducing the thickness of the portion of the imaging device 100 in which the open-close detector 120 and image sensor 130 are disposed n the Y direction. This is because the thickness of the frame base 111 is not included.

The opening 110A overlaps the entire shutter opening 64A (see FIG. 2) in the X-Z plan and has a size slightly larger than the shutter opening 64A. Further, on the frame base 111, the sound output unit 160 is disposed.

The support part 112 is continuous with the frame base 111 and on in the minus side of the frame base 111 in the X direction. The support part 112 supports the controller 140, the displacement detector 150, and the battery 170. The support part 112 is a portion extending from the frame base 111 in the −X direction, and is disposed in the cartridge chamber 61 when the imaging device 100 is attached to the camera 50. On the plus side of the frame base 111 in the Y direction, the subject exists. Therefore, the support part 112 projects toward the subject side with respect to the frame base 111. The support part 112 is on the right side of the image sensor 130 when viewed from the image capturing side (plus side in the Y direction) of the image sensor 130, which is the optical-electrical conversion element.

The support part 112 has a size substantially the same as the cartridge 11 of the film cartridge 10 that can be disposed in the cartridge chamber 61. Such a structure can inhibit the misalignment and rattling of the support part 112 in the cartridge chamber 61, and the frame 110 can be stably and properly positioned inside the camera 50.

The support part 112 includes an upper plate 112A, a lower plate 112B, a curved wall 112C, an inward projecting portion 112D, and a projecting portion 112E.

The upper plate 112A and the lower plate 112B are disc-shaped plates and respectively correspond to an upper lid and a lower lid of the cartridge 11 of the film cartridge 10 which can be disposed in the cartridge chamber 61.

The curved wall 112C connects the upper plate 112A with the lower plate 112B in the Z direction, and is curved like a side wall of a cylinder whose upper and lower ends are respectively the upper plate 112A and the lower plate 112B. The curved wall 112C continuously extends about 180 degrees counterclockwise from the plus side (front side) face of the frame base 111 in the Y direction when viewed from the plus side in the Z direction. A portion between the upper plate 112A and the lower plate 112B where the curved wall 112C does not exist is an opening 112F. As described above, the curved wall 112C is a portion having a curvature.

The inward projecting portion 112D projects down from the lower side of the upper plate 112A and has a cylindrical shape. The inside of the inward projecting portion 112D is a columnar hollow when viewed from the upper side of the upper plate 112A. The inward projecting portion 112D has a bottom parallel to the X-Y plane, and is recessed when viewed from the upper side of the upper plate 112A. Therefore, the inward projecting portion 112D can also be regarded as a recess. The inward projecting portion 112D has a bottom parallel to the X-Y plane and a cylindrical side wall.

In addition, the inward projecting portion 112D is not necessarily cylindrical as long as the shape is tubular. The tubular shape other than the cylindrical shape includes, for example, such a shape that a circular shape is partly cut off in an X-Y plane, an ellipse, and a polygon having three or more sides. Further, the inward projecting portion 112D does not need a bottom, and the bottom can be open.

Since the inward projecting portion 112D accommodates the rewinding fork 62, the inside thereof when viewed from the upper side of the upper plate 112A is a columnar hollow. The vertical length and the radial length of the hollow inside the inward projecting portion 112D are set so that the rewinding fork 62 located at the lower end of the movement range does not contact the inner side of the inward projecting portion 112D.

The inward projecting portion 112D has an opening 112D1. As the opening 112D1, a side of the cylindrical side wall of the inward projecting portion 112D where the displacement detector 150 is disposed is open from the upper end to the lower end. The opening 112D1 is provided so that the displacement detector 150 can irradiate the inside of the inward projecting portion 112D with light to detect whether the rewinding fork 62 is at the upper end or the lower end of the movement range.

Therefore, the displacement detector 150 is disposed at a height substantially the same as the opening 112D1 so that the displacement detector 150 can irradiate with light, through the opening 112D1, the rewinding fork 62 positioned at the lower end of the movable range.

The projecting portion 112E projects down from the center of the lower plate 112B and has a shape corresponding to the lower end (a portion projecting down from the cartridge 11) of the spool 11A of the cartridge 11 (see FIG. 2). The projecting portion 112E is hollow. The projecting portion 112E is not a requisite of the support part 112.

As described above, as one example, in a central portion of the frame 110 in the lateral direction, the open-close detector 120 and the image sensor 130 are disposed inside the opening area of the shutter opening 64A and face the front side (plus side in the Y direction) in the state where the imaging device 100 is attached to the camera 50.

The sound output unit 160 is disposed, for example, in an upper portion on the plus side of the frame 110 in the X direction.

The controller 140, the displacement detector 150, and the battery 170 are disposed on the support part 112 of the frame 110 and supported by the support part 112. In order to fix the controller 140, the displacement detector 150, and the battery 170 to the support part 112, another member can be used.

In particular, the battery 170 is largest among the components of the imaging device 100. Accordingly, mounting the battery 170 on the support part 112 to be stored in the cartridge chamber 61 is advantageous for efficient use of the internal space of the camera 50. The same applies to the controller 140, which is also relatively large.

Figure 6:
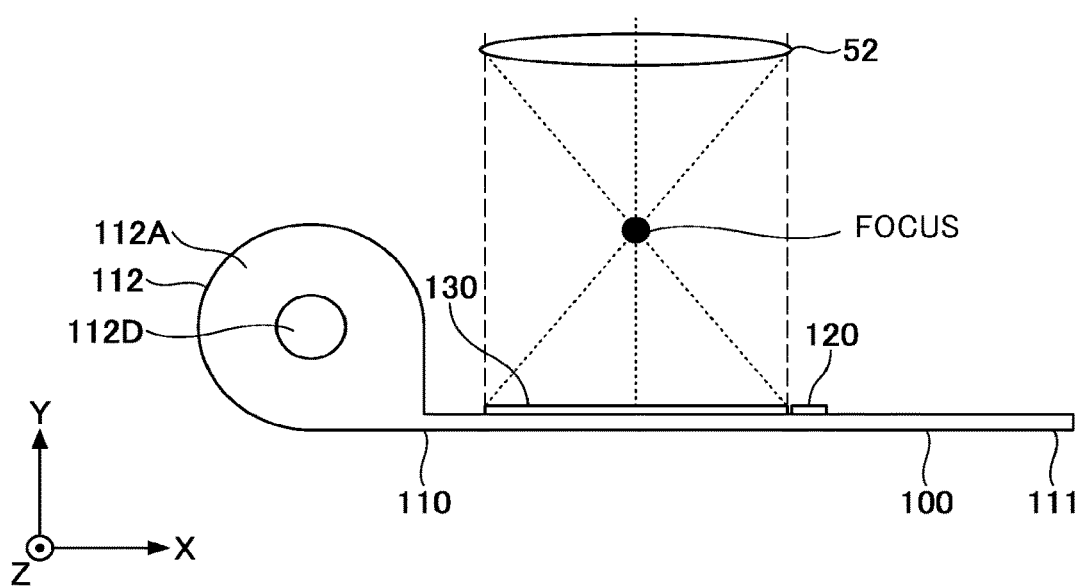
FIG. 6 is a diagram illustrating a relationship between the imaging device and a lens of the camera illustrated in FIGS. 1 and 2.

FIG. 6 is a diagram illustrating the relationship between the imaging device 100 and the lens 52. In FIG. 6, the lens 52 is simplified and illustrated as a single lens. Further, since the wiring board 115 (see FIGS. 4 and 5) on which the open-close detector 120 and the image sensor 130 are mounted is disposed in the opening 110A, the wiring board 115 and the opening 110A are omitted in FIG. 6.

The imaging device 100 is disposed so that the face of the image sensor 130 that capture light is positioned on the image forming surface of the optical system of the lens 52 in a state where the imaging device 100 is attached to the camera 50. With such a configuration, an optimum digital image can be obtained by using the lens 52 of the camera 50 which is a film camera.

Figure 7A:
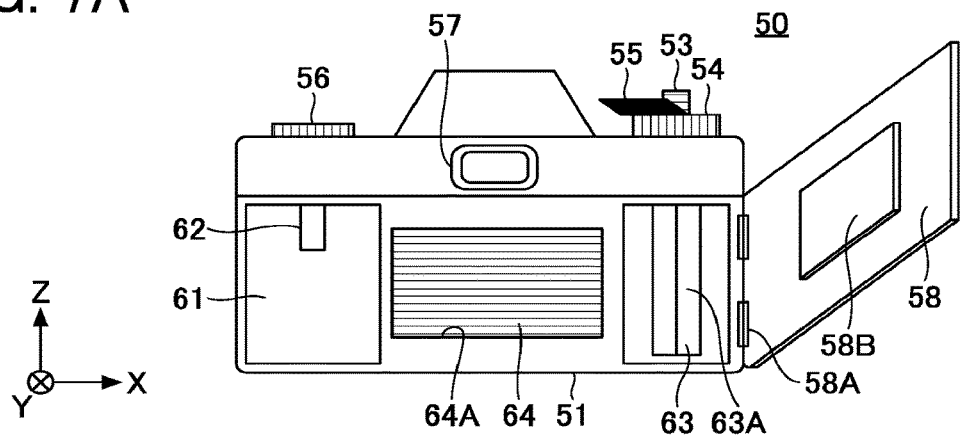
FIGS. 7A, 7B, and 7C illustrate a method of mounting the imaging device on the camera.
Figure 7B:
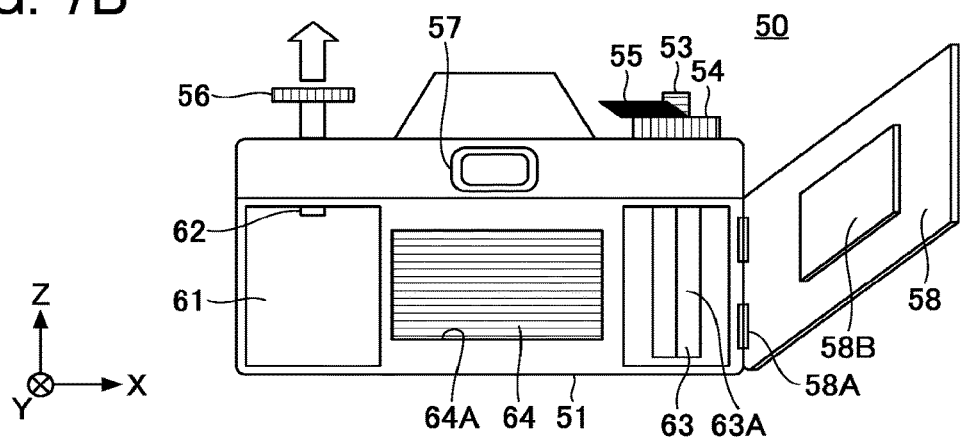
Figure 7C:
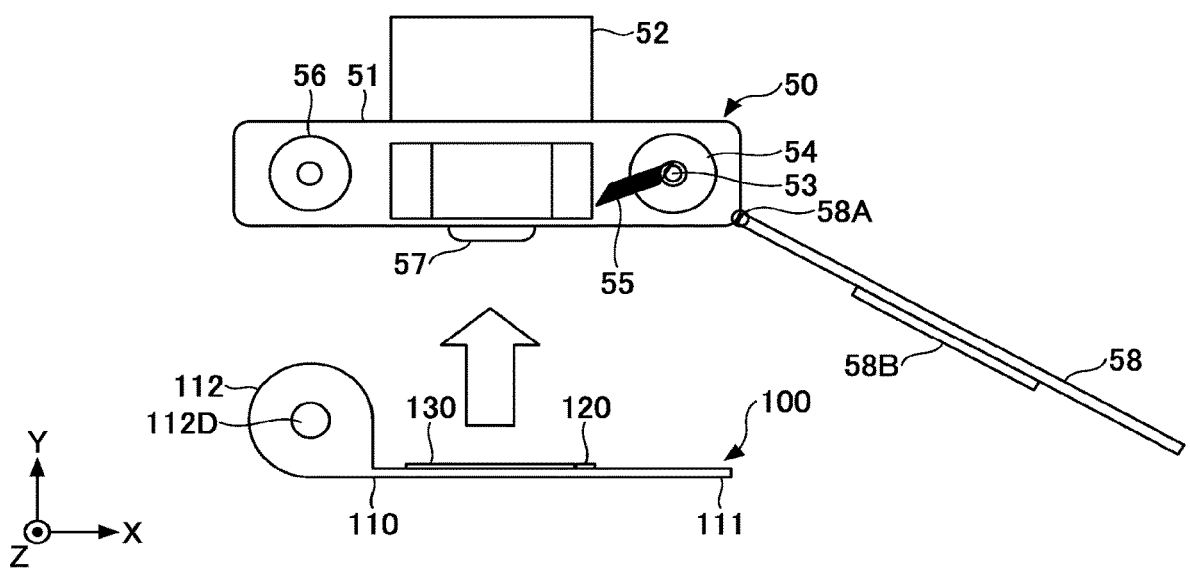

Referring to FIGS. 7A to 7C, a description is given of a method of mounting the imaging device 100 on the camera 50.

First, as illustrated in FIG. 7A, the rear lid 58 of the camera 50 is opened.

Next, as illustrated in FIG. 7B, the rewinding operation portion 56 is pulled up to position the rewinding fork 62 at the upper end of the movement range.

Next, as illustrated in FIG. 7C, the imaging device 100 is mounted inside the camera body 51. The bottom of the cartridge chamber 61 has a recess for accommodating the spool 11A of the cartridge 11. Accordingly, as the projecting portion 112E of the imaging device 100 is inserted into the recess, the frame 110 is positioned relative to the camera body 51. In this state, the imaging device 100 can be mounted in the camera body 51. The projecting portion 112E facilitates the positioning of the support part 112 in the cartridge chamber 61.

Finally, when the rewinding operation portion 56 is pushed down and the rear lid 58 is closed, the mounting of the imaging device 100 on the camera 50 is completed. At this time, the lower end of the rewinding fork 62 is inserted into the hollow inside the inward projecting portion 112D, so that the imaging device 100 is more firmly secured to the camera body 51.

In addition, as the rewinding operation portion 56 is pushed down and the rewinding fork 62 is positioned at the lower end of the movement range, the camera 50 is ready to capture an image. Alternatively, the rewinding operation portion 56 can be pushed down after the rear lid 58 is closed.

Figure 8:
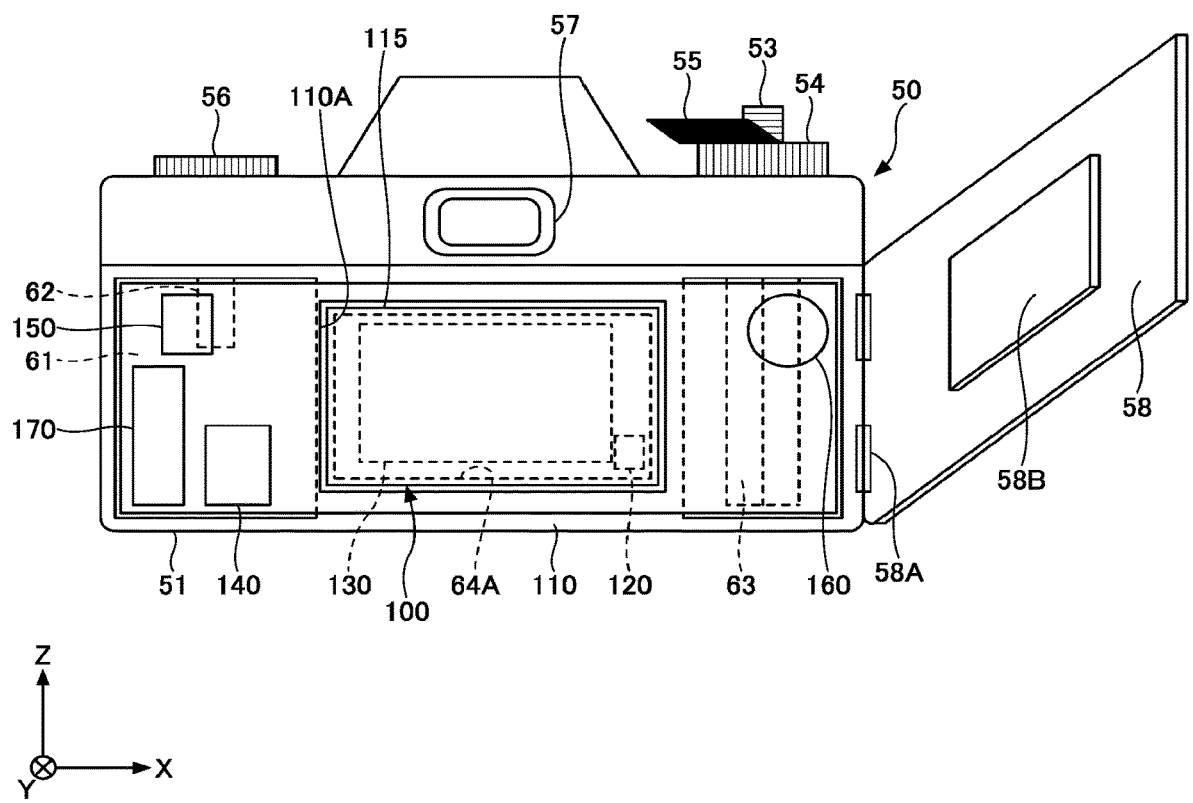
FIG. 8 is a view illustrating a state in which the imaging device is mounted inside a camera body and a rear lid is open.

FIG. 8 is a view illustrating a state in which the imaging device 100 is mounted inside the camera body 51 and the rear lid 58 is opened. In FIG. 8, the detailed configuration of the frame 110 of the imaging device 100 and the cables 180A, 180B, and 180C are omitted for simplicity.

As illustrated in FIG. 8, the imaging device 100 can be housed inside the camera body 51. The dimensions of components, such as the frame 110, of the imaging device 100 can be optimized so as not to rattle inside the camera body 51. If the position of the imaging device 100 deviates inside the camera body 51, the image sensor 130 may fail to capture an appropriate image.

Figure 9A:
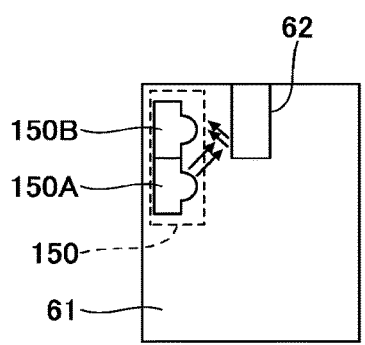
FIGS. 9A and 9B are diagrams illustrating a configuration and placement of a displacement detector of the imaging device.
Figure 9B:
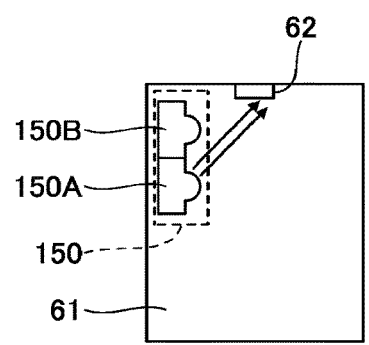

FIGS. 9A and 9B are diagrams illustrating the configuration and placement of the displacement detector 150. In FIGS. 9A and 9B, the cartridge chamber 61, the rewinding fork 62, and the displacement detector 150 are illustrated, and the frame 110 and other components are omitted for simplicity. Although the XYZ coordinate system is not illustrated in FIGS. 9A and 9B, the upper side in the drawing is the +Z direction.

The displacement detector 150 is, for example, a reflection type photointerrupter, and includes a light-emitting element 150A and a light-receiving element 150B. As one example, a light emitting diode (LED) can be used as the light-emitting element 150A, and a photodiode can be used as the light-receiving element 150B.

Although the frame 110 is omitted in FIGS. 9A and 9B, the displacement detector 150 is positioned to be able to irradiate the rewinding fork 62 with light via the opening 112D1 of the inward projecting portion 112D of the support part 112 (see FIGS. 4 and 5) when the rewinding fork 62 is at the lower end of the movable range.

As illustrated in FIG. 9A, when the rewinding fork 62 is at the lower end of the movable range, the light output by the light-emitting element 150A is reflected by the rewinding fork 62 and received by the light-receiving element 150B. In this case, the displacement detector 150 transmits, to the controller 140 (see FIG. 3), a signal indicating that the reflected light is received by the light-receiving element 150B. The light output by the light-emitting element 150A is an example of a predetermined signal output by the light-emitting element 150A. Thus, the light-emitting element 150A serves as a signal output element, and the light-receiving element 150B serves as a signal receiving element.

Further, as illustrated in FIG. 9B, when the rewinding fork 62 is at the upper end of the movable range, the light output by the light-emitting element 150A is not reflected by the rewinding fork 62, and thus is not received by the light-receiving element 150B. In this case, the displacement detector 150 transmits, to the controller 140 (see FIG. 3), a signal indicating that the reflected light is not received by the light-receiving element 150B.

In this way, the receiving state of the reflected light by the light-receiving element 150B changes according to the change in the position of the rewinding fork 62.

The controller 140 can determine whether the rewinding fork 62 is at the upper end or the lower end of the movable range, based on the signal from the displacement detector 150 that indicates whether or not the reflected light is received.

In the description here, the displacement detector 150 is a photointerrupter that uses light. However, the displacement detector 150 is not limited to a photointerrupter and but can be a detection unit that outputs a sound wave or an electromagnetic wave and outputs a signal indicating the presence or absence of a reflected wave. A sound wave or an electromagnetic wave is an example of the predetermined signal, and a receiving state of reflected light is an example of a signal receiving state.

Figure 10:
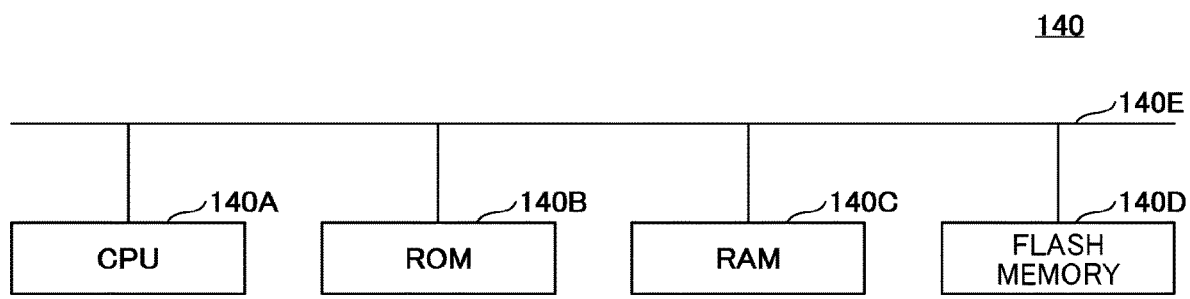
FIG. 10 is a block diagram illustrating a hardware configuration of a controller of the imaging device.

Referring now to FIG. 10, a description is given of a hardware configuration of the controller 140. The controller 140 includes a central processing unit (CPU) 140A, a read only memory (ROM) 140B, a random access memory (RAM) 140C, a flash memory 140D, and a bus 140E. The CPU 140A, the ROM 140B, the RAM 140C, and the flash memory 140D are connected via the bus 140E and can perform data communication with each other.

The CPU 140A is a device that executes various programs stored in the ROM 140B. The ROM 140B is a nonvolatile main storage device and stores various programs.

The RAM 140C is a volatile main storage device such as a dynamic RAM (DRAM) or a static RAM (SRAM). The RAM 140C provides a work area to which various programs stored in the ROM 140B are loaded when the CPU 140A executes the programs. The flash memory 140D stores data obtained by calculation by the CPU 140A.

Figure 11:
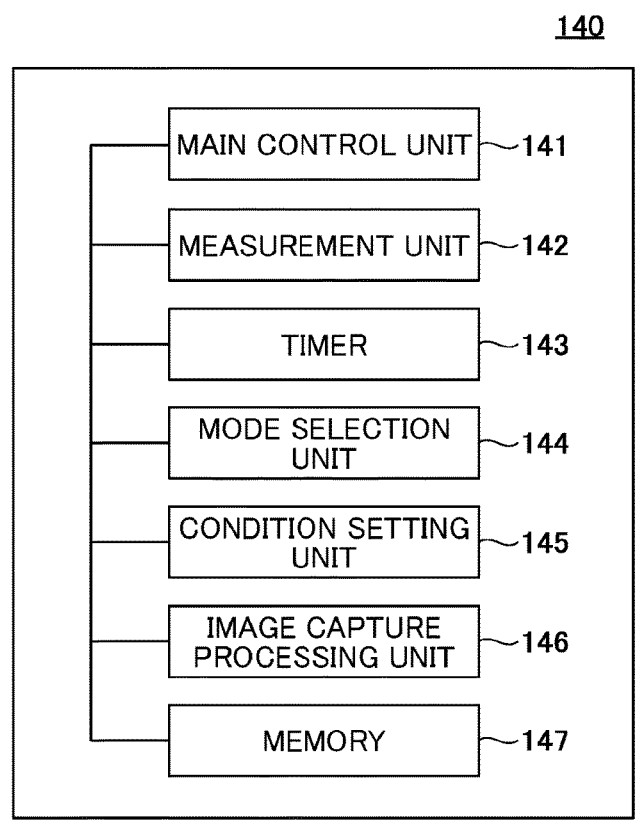
FIG. 11 is a block diagram illustrating a functional configuration of the controller illustrated in FIG. 10.

FIG. 11 is a block diagram illustrating a functional configuration of the controller 140. The controller 140 includes a main control unit 141, a measurement unit 142, a timer 143, a mode selection unit 144, a condition setting unit 145, an image capture processing unit 146, and a memory 147.

The main control unit 141, the measurement unit 142, the timer 143, the mode selection unit 144, the condition setting unit 145, and the image capture processing unit 146 are representation, as functional blocks, of the programs executed by the controller 140 (control circuitry). The memory 147 is a functional representation of the ROM 140B, the RAM 140C, and the flash memory 140D of the controller 140.

The main control unit 141 is a processing unit that controls the processing of the controller 140, and executes processing other than the processing executed by the measurement unit 142, the timer 143, the mode selection unit 144, the condition setting unit 145, and the image capture processing unit 146.

The measurement unit 142 measures, with the timer 143, the open time (exposure time) from when the shutter curtain 64 is switched to open (and kept open) to when the shutter curtain 64 is switched to be closed, based on the signal indicating the detection result input from the open-close detector 120 to the controller 140. The measurement unit 142 stores, in the memory 147, data representing the open time measured with the timer 143.

The timer 143 is used by the measurement unit 142 for measuring the open time (exposure time), and counts the elapsed time based on a command from the measurement unit 142. The timer 143 is an elapsed time counter that counts elapsed time.

The mode selection unit 144 selects the measurement mode in response to the signal, input from the displacement detector 150 to the controller 140, indicating the detection result that the reflected light (or reflected wave) is not received. The measurement mode is a mode in which the measurement unit 142 measures the open time.

The detection result that the reflected light or reflected wave is not received indicates that the rewinding fork 62 is at the upper end of the movement range and the rewinding operation portion 56 is at the pulled-up position. The measurement is performed when the rewinding operation portion 56 is pulled up.

In addition, when the signal input from the displacement detector 150 to the controller 140 indicates the detection result that the reflected light or wave is received, the mode selection unit 144 selects the image capturing mode. The image capturing mode is a mode in which the image sensor 130 captures an image and obtains a digital image.

Upon switching to the image capturing mode, the condition setting unit 145 reads out the open time (exposure time) measured by the measurement unit 142 in the measurement mode from the memory 147, and sets the exposure time for the image sensor 130 to acquire a digital image via the shutter curtain 64 and the lens 52. The exposure time is an example of the image capturing condition set by the condition setting unit 145.

Since the open time (exposure time) measured by the measurement unit 142 is set as the exposure time for the image sensor 130 to acquire a digital image in this way, the exposure time of the imaging device 100 inside the camera 50 can be set in the state where the imaging device 100 is attached to the camera 50.

Further, the rewinding operation portion 56 is used as a predetermined operation portion for switching the mode. Therefore, the switching between the measurement mode and the image capturing mode can be performed without any modification of the camera 50.

Alternatively, in addition to the exposure time as the image capturing condition, the condition setting unit 145 can set the degree of gamma correction in accordance with the open time measured by the measurement unit 142. For example, the color tone (hue or shade) of the digital image obtained with the open time measured by the measurement unit 142 may differ depending on the type of the camera 50. Accordingly, setting the degree of gamma correction according to the type of the camera 50 can be advantageous.

Setting the degree of gamma correction according to the type of the camera 50 involves: preliminarily storing a table of data of the degree of gamma correction associated with the open time in the memory regarding the imaging device 100 for the camera 50 of a specific type; and then setting the degree of gamma correction associated with the open time.

In response to selecting of the image capturing mode by the mode selection unit 144, the image capture processing unit 146 performs image capturing processing. The image capturing processing includes: causing the condition setting unit 145 to set the exposure time of the image sensor 130; determining whether the shutter curtain 64 is open; causing the image sensor 130 to capture an image in response to a determination that the shutter curtain 64 is open; and storing in the memory 147 a digital image obtained by the image capturing.

The memory 147 stores data of the open time measured by the measurement unit 142, and data of a digital image acquired by the image sensor 130.

Figure 12:
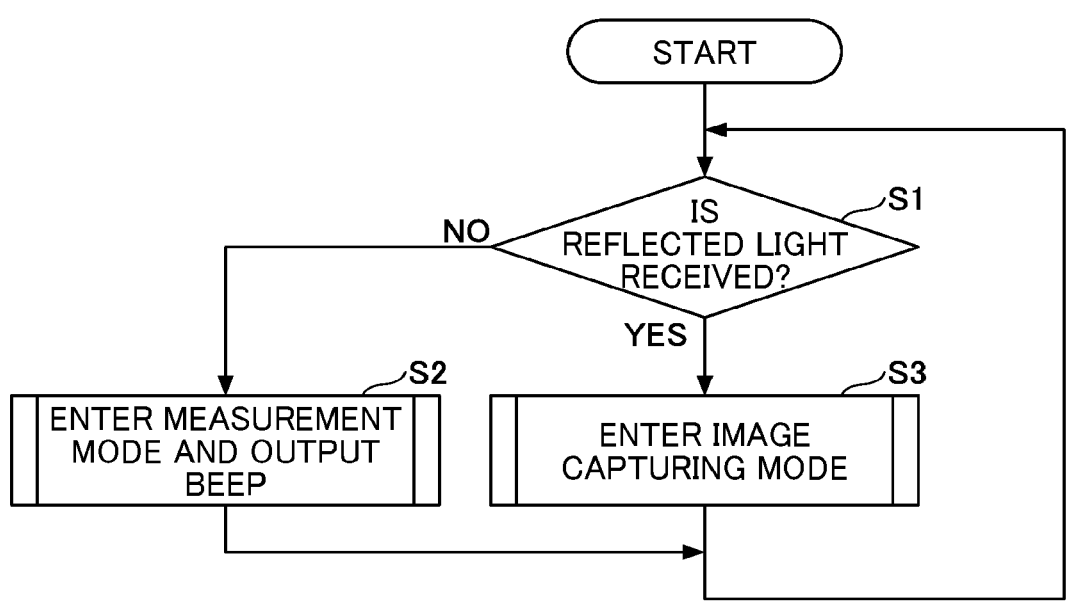
FIG. 12 is a flowchart of processes executed by the controller of the imaging device.

FIG. 12 is a flowchart of the processes executed by the controller 140.

In response to power-on of the controller 140, the mode selection unit 144 determines whether the signal input from the displacement detector 150 to the controller 140 indicates the detection result that the reflected light (or reflected wave) is received (S1). This is performed to determine whether or not the measurement mode for measuring the open time of the shutter curtain 64 is set before image capturing in order to obtain the open time used as the exposure time for the image capturing.

Figure 13:
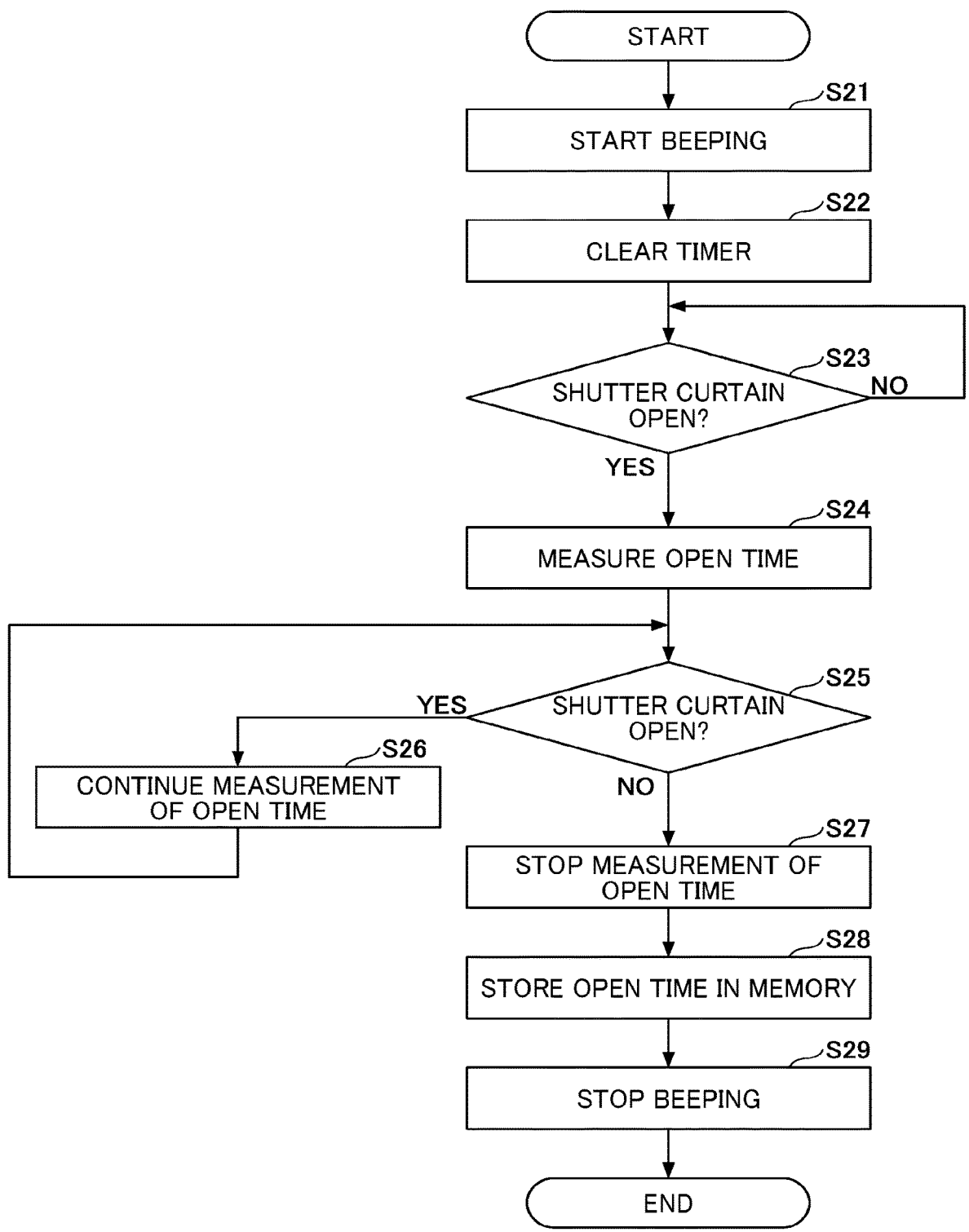
FIG. 13 is a flowchart illustrating processing in a measurement mode of the imaging device.

In response to the signal indicating the detection result that the reflected light (or reflected wave) is not received (S1: NO), the mode selection unit 144 selects the measurement mode (S2). When the measurement mode is selected (the imaging device 100 enters the measurement mode), the processing illustrated in FIG. 13 is performed.

In S2, the main control unit 141 causes the sound output unit 160 to intermittently output a beep sound. During the measurement mode, the sound output unit 160 outputs the beep sound to notify the user that the imaging device 100 is in the measurement mode.

Figure 14:
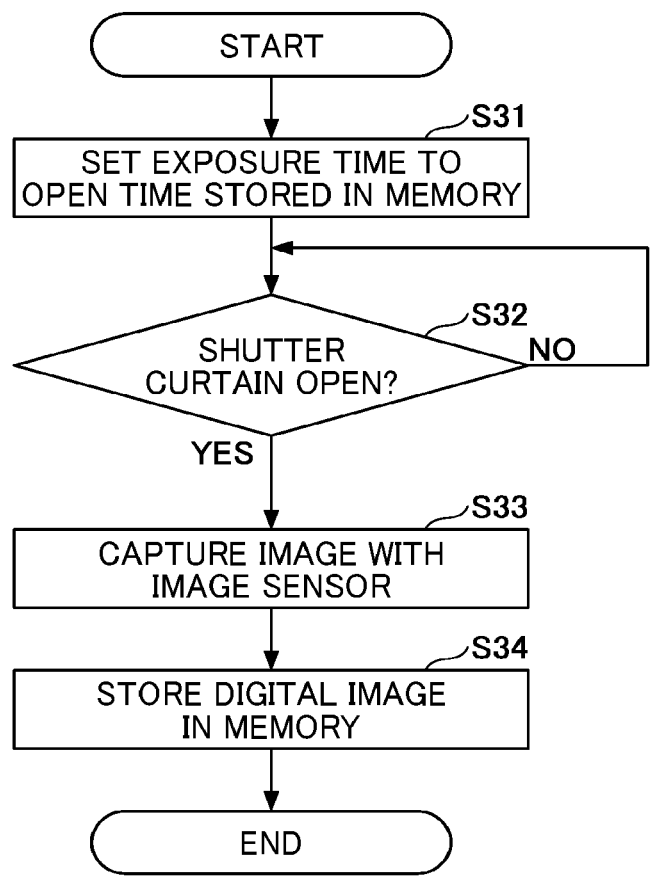
FIG. 14 is a flowchart illustrating processing in an image capturing mode of the imaging device.

By contrast, in response to the signal indicating the detection result that the reflected light (or reflected wave) is received (S1: YES), the mode selection unit 144 selects the image capturing mode (S3). In response to selecting of the image capturing mode (the imaging device enters the image capturing mode), the processing illustrated in FIG. 14 is performed.

When the measurement mode or the image capturing mode ends, the process returns to S1, and the mode selection unit 144 repeats the processing.

FIG. 13 is a flowchart illustrating the measurement processing.

In response to selecting of the measurement mode by the mode selection unit 144, the measurement unit 142 starts the measurement processing.

The main control unit 141 causes the sound output unit 160 to start intermittent output of the beep sound (S21).

The measurement unit 142 clears the timer 143 (S22).

Next, the measurement unit 142 determines whether or not the shutter curtain 64 is open based on the signal indicating the detection result input from the open-close detector 120 to the controller 140 (S23). In S23, the open/closed state of the shutter curtain 64 is determined.

When the measurement unit 142 determines in S23 that the shutter curtain 64 is open (S23: YES), the measurement unit 142 causes the timer 143 to start measuring the open time (S24). In response to the determination that the shutter curtain 64 is closed (S23: NO), the measurement unit 142 repeats the process in S23.

Next, the measurement unit 142 determines whether or not the shutter curtain 64 is open, based on the signal indicating the detection result input from the open-close detector 120 to the controller 140 (S25). This is to detect whether the shutter curtain 64 has switched to the closed state. In S25, the open/closed state of the shutter curtain 64 is determined.

When the measurement unit 142 determines in S25 that the shutter curtain 64 is open (S25: YES), the measurement unit 142 causes the timer 143 to continue the measurement of the open time (S26).

When the measurement unit 142 determines in S25 that the shutter curtain 64 is closed (S25: ON), the measurement unit 142 causes the timer 143 to stop the measurement of the open time (S27).

The measurement unit 142 acquires the data indicating the open time from the timer 143 and stores the data in the memory 147 (S28).

Next, the main control unit 141 causes the sound output unit 160 to stop outputting the beep sound (S29).

Then, the measurement unit 142 ends the measurement processing.

FIG. 14 is a flowchart illustrating the image capturing processing.

In response to selecting of the image capturing mode by the mode selection unit 144, the image capture processing unit 146 starts the image capturing processing.

The image capture processing unit 146 causes the condition setting unit 145 to set the exposure time of the image sensor 130 to the open time stored in the memory 147 (S31). Then, the condition setting unit 145 reads out the open time from the memory 147 and sets the open time as the exposure time of the image sensor 130.

The image capture processing unit 146 determines whether or not the shutter curtain 64 is open, based on the signal indicating the detection result input from the open-close detector 120 to the controller 140 (S32). In S32, the open/closed state of the shutter curtain 64 is determined.

In response to the determination in S32 that the shutter curtain 64 is open (S32: YES), the measurement unit 146 causes the image sensor 130 to capture an image (S33). Then, the image sensor 130 operates the electronic shutter to acquire a digital image.

In response to the determination in S32 that the shutter curtain 64 is closed (S32: NO), the image capture processing unit 146 repeats the process in S32. This is to wait until the shutter curtain 64 is opened.

When the image capturing by the image sensor 130 is completed, the image capture processing unit 146 stores the digital image in the memory 147 (S34).

When the digital image is stored in the memory 147, the image capture processing unit 146 ends the image capturing mode.

As described above, before image capturing, the imaging device 100 measures the open time (exposure time) of the shutter curtain 64 through the operation of the camera 50 in the measurement mode. The measurement unit 142 measures the open time based on the detection result generated by the open-close detector 120. The open time is a time to be used as an exposure time for the imaging device 100 to capture an image in the image capturing mode executed after the measurement mode.

Therefore, the open time of the shutter curtain 64 set by the shutter speed adjusted by the shutter speed dial 54 of the camera 50 can be reflected in the exposure time for the imaging device 100 to capture an image.

Therefore, an aspect of the present disclosure can provide the imaging device 100 that can reflect the exposure time of the film camera 50.

Further, when the imaging device 100 is housed inside the camera body 51 and the rear lid 58 is closed, the imaging device 100 is not visible from the outside of the camera 50. Therefore, an aspect of the present disclosure can provide the imaging device 100 to be attached to the camera 50 without impairing the appearance of the existing camera 50.

Further, an aspect of the present disclosure can provide the imaging device 100 that enables acquisition of a digital image through the lens 52 without requiring any change inside the camera 50. Therefore, when the imaging device 100 is detached from the camera 50, the camera 50 returns to a film camera, and silver-salt photography is feasible when the film cartridge 10 is loaded therein.

Further, in the image capturing mode, the opening of the shutter curtain 64 by the operation of the shutter button 53 is detected, and the image sensor 130 captures light over the exposure time to acquire a digital image. The aperture (f-number) at this time is adjusted by the aperture adjustment mechanism of the lens 52, and the shutter speed is adjusted by the shutter speed dial 54.

Therefore, an aspect of this disclosure can provide the imaging device 100 capable of acquiring a digital image by operating the camera 50.

Further, since the imaging device 100 includes the condition setting unit 145, the open time measured in the measurement mode can be set as the exposure time for the image sensor 130 to acquire a digital image.

Moreover, since the measurement mode can be selected by pulling up the rewinding operation portion 56, the imaging device 100 can select the measurement mode without impairing the appearance of the existing camera 50.

In addition, since the displacement detector 150 can detect the displacement of the rewinding fork 62 that moves in conjunction with the rewinding operation portion 56, the mode of the imaging device 100 can be selected in accordance with the state of receiving of the reflected light in the displacement detector 150.

The measurement mode is selected in response to the detection result, generated by the displacement detector 150, indicating the upward displacement of the rewinding fork 62, and the image capturing mode is selected in response to the detection result indicating that the rewinding fork 62 is at the lower end of the movement range. Therefore, the mode of the imaging device 100 can be selected using the rewinding operation portion 56, which is one of the operation portions of the camera 50, and the rewinding fork 62 that moves in conjunction with the rewinding operation portion 56.

In order to extract the digital image acquired by the imaging device 100 from the imaging device 100, the imaging device 100 can be connected, for example, via a cable or a network, to a personal computer (PC), a tablet computer, a smartphone, or the like of the user to read out the digital image from the memory 147.

For connecting the imaging device 100 to a PC, a tablet computer, a smartphone, or the like via a cable, the imaging device 100 can include a connector for connection with the cable. The digital image can be read, for example, by wired communication via the cable with the rear lid 58 opened or the imaging device 100 removed from the camera 50.

For reading by wireless communication, the imaging device 100 can include a communication unit for wireless communication so that the imaging device 100 wirelessly communicates with a PC, a tablet computer, a smartphone, or the like for reading out a digital image.

Next, a modification is described below.

In the description above, in the state where the rear lid 58 of the camera 50 open, the imaging device 100 is housed in the cartridge chamber 61 of the camera body 51 and the space between the shutter curtain 64 and the pressure plate 58B, after which the rear lid 58 is closed, thereby mounting the imaging device 100 to the camera 50.

Alternatively, the imaging device 100 can be attached to the plus-side face (front side) of the rear lid 58 in the Y direction, and then the rear lid 58 to which the imaging device 100 is attached can be closed, thereby mounting the imaging device 100 in the camera 50. In this case, the imaging device 100 is configured to avoid the pressure plate 58B.

Further, the imaging device 100 can be integral with a rear lid having the same shape as the rear lid 58 so that the imaging device 100 is attached to the camera 50 after the rear lid 58 is removed from the camera 50. In this case, the hinge 58A can be used to attach the imaging device 100 integral with the rear lid to the camera 50.

Further, in the above, the rewinding fork 62 is used as one example of the movable portion used for selecting the mode, and the rewinding fork 62 is moved in the vertical direction by the rewinding operation portion 56 to select either the measurement mode or the image capturing mode.

However, examples of the movable portion is not limited to the rewinding fork 62, and can include, for example, the spool 63 that is interlocked with a movement of the film advance lever 55. In this case, the displacement by rotation of the spool 63 can be detected by the displacement detector 150, and the measurement mode or the image capturing mode can be selected in response to a detection result indicating a displacement in a predetermined rotation direction of the film advance lever 55.

Here, the displacement by rotation of the spool 63 means that the position of each part of the spool 63 changes due to the angle change due to the rotation of the spool 63. For example, the position of the slit of the winding shaft 63A of the spool 63 changes as the spool 63 rotates. Such a change in position also occurs in a portion other than the slit, and can be regarded as a displacement by rotation of the spool 63.

When the displacement detector 150 detects the displacement by rotation of the spool 63, the film advance lever 55 is an example of the operation portion, and the spool 63 is an example of the movable portion used for mode selection.

Further, in this case, the displacement detector 150 can be disposed on the plus side in the Y direction of the frame base 111 and in a plus-side portion in the X direction of the frame base 111. In a structure where the displacement detector 150 is on the frame base 111, the frame 110 can be without the support part 112. The controller 140 and the battery 170 can be disposed on the frame base 111.

Since the film advance lever 55 is used as the operation portion for switching the mode, the switching between the measurement mode and the image capturing mode can be performed without any modification of the camera 50.

In addition, since the displacement detector 150 can detect the displacement of the spool 63 that move in conjunction with the film advance lever 55, the mode of the imaging device 100 can be selected in accordance with the state of receiving of the reflected light in the displacement detector 150.

Further, in the case where the frame 110 does not have the support part 112, the frame 110 can be downsized and the imaging device 100 can be downsized. Further, in this case, the open-close detector 120 and the displacement detector 150 can be efficiently disposed in the space between the shutter curtain 64 and the pressure plate 58B, in which the frame base 111 of the frame 110 is disposed.

Although, in the example described above, the movable portion is the rewinding fork 62 that is inside the camera body 51 and is not visible from the outside, alternatively, the movable portion can be one of the components of the camera 50 that is movable and visible from the outside. In this case, the appearance of the camera 50 can be changed by attaching the imaging device 100.

Further, in the embodiment described above, the measurement mode is selected when the rewinding fork 62 has moved to the upper end in the movement range. Alternatively, the measurement mode can be selected when the rewinding fork 62 has displaced to the lower end in the movement range.

In addition, in the embodiment described above, the controller 140 is on the support part 112 of the frame 110 and is to be housed in the cartridge chamber 61. Alternatively, the controller 140 can be on the frame base 111 and to be disposed in a portion other than the cartridge chamber 61.

In addition, in the embodiment described above, the battery 170 is on the support part 112 of the frame 110 and to be disposed in the cartridge chamber 61. Alternatively, the battery 170 can be on the frame base 111 and to be disposed in a portion other than the cartridge chamber 61.

In the description above, the sound output unit 160 outputs the beep sound intermittently while the measurement mode is selected, but the manner of beeping is not limited thereto.

For example, the sound output unit 160 can output a beep sound in response to switching of the imaging device 100 to either the measurement mode or the image capturing mode. As one example, the sound output unit 160 can output a beep sound once in response to switching of the imaging device 100 to the measurement mode and can output the beep sound twice in response to switching to the image capturing mode.

In this case, the user of the camera 50 mounted with the imaging device 100 can recognize whether the imaging device 100 is in the measurement mode or the image capturing mode depending on the number of beeps.

The sound output unit 160 can output a beep sound in response to the detection, by the displacement detector 150, that the rewinding fork 62 has reached the upper end or the lower end of the movement range. In this case, the number of times of output of the beep sound is made different between when the upper end is reached at the upper end and when the lower end is reached at the lower end, and the numbers of times of output of the beep sound is made different from when the mode is switched to the measurement mode and the image capturing mode.

In the description above, the sound output unit 160 outputs the beep sound, but the sound output by the sound output unit 160 can be a sound other than the beep sound.

In the description above, the sound output unit 160 intermittently outputs the beep sound while the measurement mode is selected, but the imaging device 100 may not include the sound output unit 160. Whether the imaging device 100 is in the measurement mode or the image capturing mode is to be confirmed by the operation by the user of the rewinding operation portion 56 and the like.

In the description above, the sound output unit 160 is used as the mode information output device as one example of the notification device, but a vibration element that outputs vibration can be used instead of the sound output unit 160. In this case, for example, the vibration element intermittently vibrates while the measurement mode is selected, so that the user can recognize that the imaging device 100 is in the measurement mode.

When the imaging device 100 is attached to the camera 50, the imaging device 100 is not visible from the outside of the camera 50. However, vibration is transmitted to the entire camera 50, and the user can recognize whether the measurement mode is selected based on the vibration.

In the description above, the displacement detector 150 is disposed at the position corresponding to the lower end of the movement range of the rewinding fork 62. Alternatively, one displacement detector 150 can be disposed at each of the position corresponding to the lower end and the position corresponding to the upper end of the movement range of the rewinding fork 62.

Moreover, although the imaging device 100 has two modes of the measurement mode and the image capturing mode in the description above, the imaging device 100 can further include a third mode different from the measurement mode and the image capturing mode.

The third mode can be selectable by an operation from outside the camera 50 in the following configuration. One displacement detector 150 is disposed at each of the position corresponding to the lower end of the movement range of the rewinding fork 62 and an intermediate position between the lower end and the upper end, to detect whether the rewinding fork 62 is at the lower end, the intermediate position, or the upper end of the movable range.

Figure 15A:
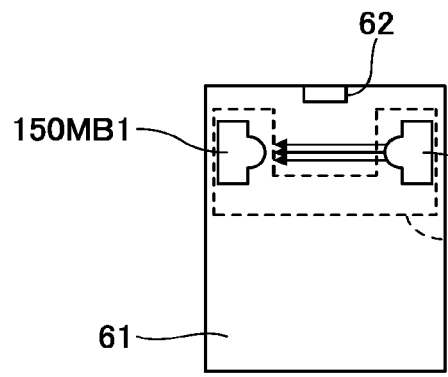
FIGS. 15A and 15B are diagrams illustrating a displacement detector according to a modification.
Figure 15B:
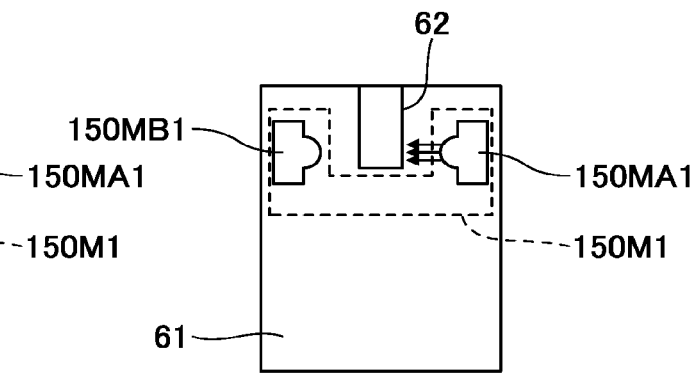

In the description above, the displacement detector 150 is a reflection photointerrupter, but the displacement detector 150 can be a transmission photointerrupter. FIGS. 15A and 15B are diagrams illustrating a displacement detector 150M1 according to a modification of the above-described embodiment. Although the XYZ coordinate system is not illustrated in FIGS. 15A and 15B, the upward direction in the drawings is the +Z direction.

The displacement detector 150M1 is a transmissive photointerrupter and includes a light-emitting element 150MA1 and a light-receiving element 150MB1. The light-emitting element 150MA1 and the light-receiving element 150MB1 are disposed to face each other with the rewinding fork 62 interposed therebetween. Except that, the light-emitting element 150MA1 and the light-receiving element 150MB1 are the same as the light-emitting element 150A and the light-receiving element 150B of the reflective photointerrupter.

The light-emitting element 150MA1 and the light-receiving element 150MB1 are at the same position in the vertical direction in the cartridge chamber 61 and positioned to satisfy the following two conditions. The first condition is that, when the rewinding fork 62 is at the upper end of the movement range, the light output from the light-emitting element 150MA1 is received by the light-receiving element 150MB1 as illustrated in FIG. 15A. The second condition is that, when the rewinding fork 62 is at the lower end of the movement range, the light output from the light-emitting element 150MA1 is blocked by the rewinding fork 62 and is not received by the light-receiving element 150MB1 as illustrated in FIG. 15B.

With the light-emitting element 150MA1 and the light-receiving element 150MB1 disposed at such positions in the cartridge chamber 61, whether the rewinding operation portion 56 is pulled up from or pushed into the camera body 51 is recognizable.

Although the displacement detector 150M1 is described as a photointerrupter that uses light, the displacement detector 150M1 is not limited to a photointerrupter. Alternatively, the displacement detector 150M1 can be a detector that outputs a sound wave or an electromagnetic wave and outputs a signal indicating the presence or absence of a reflected wave. A sound wave or an electromagnetic wave is an example of the predetermined signal.

Figure 16A:
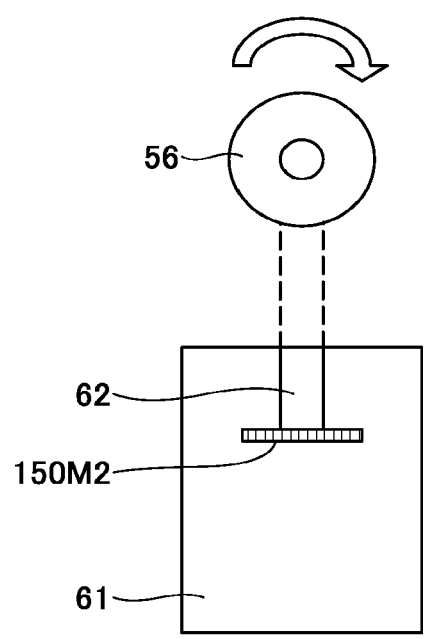
FIGS. 16A and 16B are diagrams illustrating a displacement detector according to another modification.
Figure 16B:
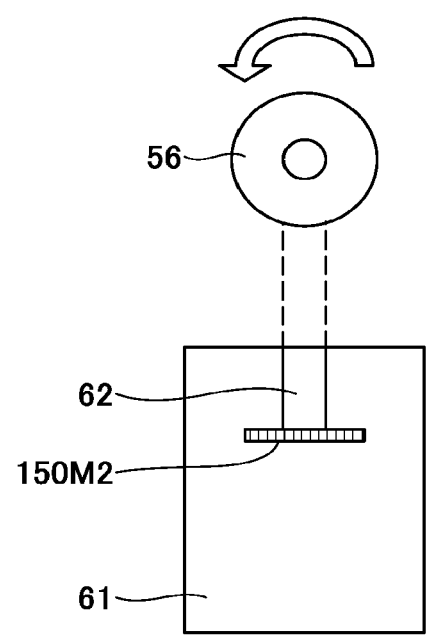

Further, instead of the displacement detector 150 described above, a displacement detector 150M2 that detects a rotation of the rewinding operation portion 56 can be used as illustrated in FIGS. 16A and 16B. FIGS. 16A and 16B are diagrams illustrating the displacement detector 150M2 according to a modification of the above-described embodiment. In FIGS. 16A and 16B, an upper half illustrates the rewinding operation portion 56 in a X-Y plane view, and a lower half illustrates the displacement detector 150M2 disposed in the cartridge chamber 61. The upward direction in the cartridge chamber 61 is the +Z direction.

The displacement detector 150M2 is, for example, a rotary encoder, and a rotation shaft thereof is coupled to the lower end of the rewinding fork 62. An opening is formed at the lower end of the inward projecting portion 112D of the frame 110 (see FIGS. 4 and 5), and the displacement detector 150M2 is secured to and hung down from the lower end of the inward projecting portion 112D so that the rotation shaft is located under the opening. The lower end of the rewinding fork 62 is coupled, passing through the opening, to the rotation shaft of the displacement detector 150M2.

The rotary encoder as the displacement detector 150M2 can detect the rotation direction of the rewinding fork 62. The rotation direction of the rewinding fork 62 is the same as the rotation direction of the rewinding operation portion 56. Therefore, the clockwise rotation and the counterclockwise rotation of the rewinding fork 62 are detected with the camera 50 viewed in the X-Y plane, and switching between the measurement mode and the image capturing mode can be performed.

The rotation direction of the rewinding fork 62 is the direction of displacement due to the rotation of the rewinding fork 62. The displacement by rotation of the rewinding fork 62 means that the position of each part of the rewinding fork 62 changes due to the change of the angle change due to the rotation of the rewinding fork 62. This is similar to the displacement due to the rotation of the spool 63.

In the configuration in which the displacement detector 150M2 detects the rotation direction of the rewinding fork 62, to attach the imaging device 100 to the camera 50, first, the rewinding operation portion 56 is pulled up to move the rewinding fork 62 to the upper end of the movement range. In this state, the imaging device 100 is placed inside the camera body 51.

Then, the rewinding operation portion 56 is pushed down to insert the rewinding fork 62 into the hollow inside the inward projecting portion 112D, and the lower end of the rewinding fork 62 is inserted into the rotation shaft of the displacement detector 150M2 through the opening at the lower end of the inward projecting portion 112D.

Therefore, the rotary encoder as the displacement detector 150M2 includes the rotation shaft into and from which the lower end of the rewinding fork 62 can be inserted and pull out, and the lower end of the rewinding fork 62 inserted in the rotation shaft can be secured thereto.

By detecting the rotational direction of the rewinding fork 62 with the displacement detector 150M2 constructed of the rotary encoder, switching between the measurement mode and the image capturing mode can be performed depending on the rotational direction of the rewinding operation portion 56.

Further, the displacement detector 150M2 being the rotary encoder can detect the rotation direction of the spool 63. The rotation direction of the spool 63 is the same as the rotation direction of the film advance lever 55. In this case, the rotation direction of the spool 63 is detected with the displacement detector 150M2 so that the measurement mode or the image capturing mode can be selected depending on the rotation direction. The displacement detector 150M2 can be disposed so that the rotation of the spool 63 is transmitted to an input rotation shaft of the rotary encoder serving as the displacement detector 150M2.

By detecting the rotational direction of the spool 63 with the displacement detector 150M2 constructed of the rotary encoder, switching between the measurement mode and the image capturing mode can be performed depending on the rotational direction of the film advance lever 55.

In this case, the frame 110 can be without the support part 112. The controller 140 and the battery 170 can be disposed on the frame base 111.

Figure 17A:
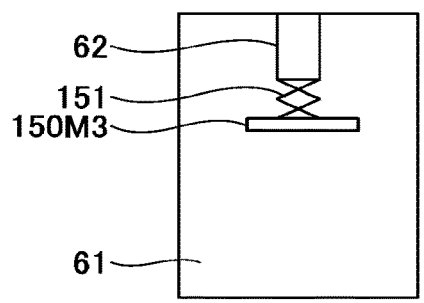
FIGS. 17A and 17B are diagrams illustrating a displacement detector according to another modification.
Figure 17B:
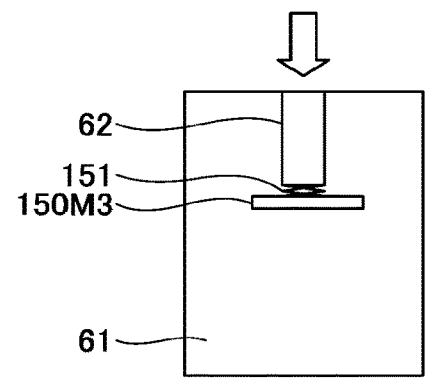

Further, instead of the displacement detector 150 described above, a displacement detector 150M3 that detects a downward pressing of the rewinding operation portion 56 can be used as illustrated in FIGS. 17A and 17B. FIGS. 17A and 17B are diagrams illustrating the displacement detector 150M3 according to a modification of the above-described embodiment. The upward direction in the cartridge chamber 61 is the +Z direction.

The displacement detector 150M3 is, for example, a pressure sensor, and is in contact with the lower end of the rewinding fork 62 via a spring 151 as an elastic member. The elastic member is not limited to a spring but can be sponge or rubber that contracts upon pressure. Depending on the type of the camera 50, the rewinding operation portion 56 can be pressed down, and the rewinding fork 62 also moves down with the pressing of the rewinding operation portion 56. In the camera 50 of this type, the displacement detector 150M3 as a pressure sensor can be used.

An opening is formed at the lower end of the inward projecting portion 112D of the frame 110 (see FIGS. 4 and 5), and the displacement detector 150M3 is secured to and hung down from the lower end of the inward projecting portion 112D so that the spring 151 is located under the opening.

The spring 151 can be fixed to the upper face of the displacement detector 150M3. The spring 151 generates a restoring force that pushes up the rewinding operation portion 56 against the upper face of the displacement detector 150M3 when the rewinding operation portion 56 is pressed down. The spring 151 provides a reaction force to push back when the rewinding operation portion 56 is pressed down, and the spring 151 causes the rewinding operation portion 56 to act like a push button switch having a reaction force.

When the rewinding operation portion 56 is pressed to the lower end of the vertically movable range, the spring 151 is fully contracted, and the displacement detector 150M3 detects an increase in pressure. In other words, the displacement detector 150M3 detects the displacement of the movable portion according to an increase in pressure. When the user releases the rewinding operation portion 56 in this state, the rewinding operation portion 56 is pushed back upward by the spring 151, and the displacement detector 150M3 does not detect an increase in pressure.

By using the displacement detector 150M3 as described above, switching between the measurement mode and the image capturing mode can be performed based on the downward pressing of the rewinding operation portion 56. For example, the measurement mode can be selected while the rewinding operation portion 56 is continuously pressed down, and the image capturing mode can be selected while the rewinding operation portion 56 is not pressed.

Further, either the measurement mode or the image capturing mode can be selected depending on the number of times the rewinding operation portion 56 is pressed down. For example, the measurement mode can be selected by one pressing, and the image capturing mode can be selected by continuous twice pressing.

Alternatively the image capturing mode can be selected while the rewinding operation portion 56 is continuously pressed down, and the measurement mode can be selected while the rewinding operation portion 56 is not pressed. In this case, the measurement mode is selected when the displacement detector 150M3 detects a decrease in pressure.

Further, in the description above, the sound output unit 160 is used as the mode information output device. Alternatively, how the user feels in operating the operation portion of the camera 50 can be altered so that the user can recognize whether the imaging device 100 is in the measurement mode or the image capturing mode.

Figure 18:
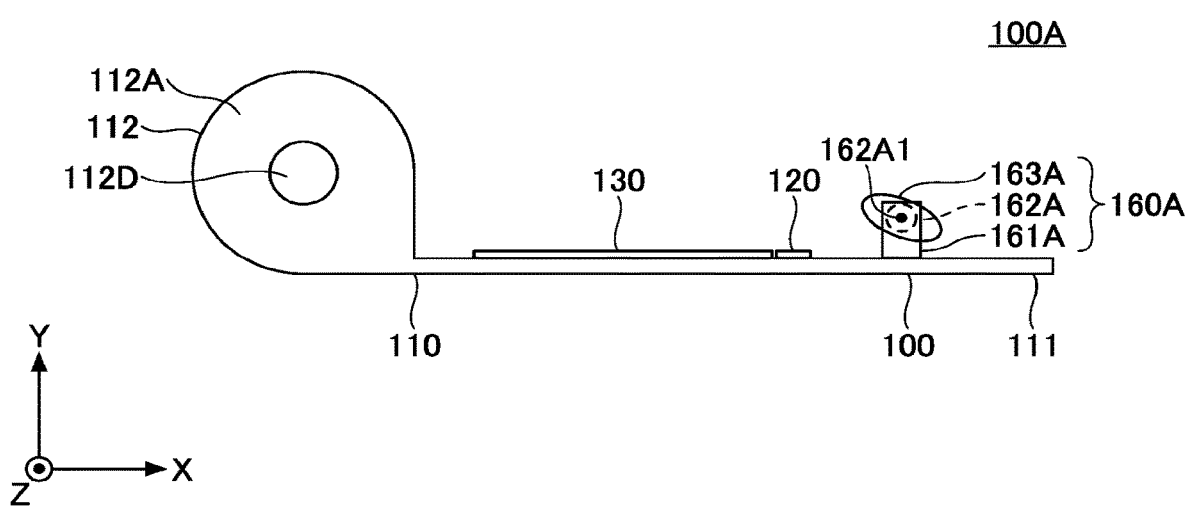
FIG. 18 is a diagram illustrating an imaging device according to a modification.

FIG. 18 is a diagram illustrating an imaging device 100A according to a modification of the above-described embodiment. The imaging device 100A does not include the sound output unit 160 (see FIGS. 3 to 5) as the mode selection unit, but includes a torque changer 160A instead. In the state where the imaging device 100A is attached to the camera 50, the torque changer 160A is positioned near the spool 63 and makes the operation force (operation torque) of the film advance lever 55 variable (changeable).

The torque changer 160A includes a support 161A, an electromagnetic actuator 162A, and a cam 163A. In the frame 110, the support 161A is attached in a plus-side area in the X direction and on the plus-side face in the Y direction. The support 161A is columnar and is attached to the frame 110.

The electromagnetic actuator 162A is embedded in a tip side portion (plus side in the Y direction) of the support 161A, and the cam 163A is coupled to a rotation shaft 162A1 of the electromagnetic actuator 162A. The electromagnetic actuator 162A is connected to the controller 140 via a cable and is driven by the controller 140 to rotate the cam 163A by 90 degrees in the X-Y plane.

Similar to the sound output unit 160, the electromagnetic actuator 162A can be driven by the main control unit 141 of the controller 140 in accordance with the mode (measurement mode or image capturing mode) selected by the mode selection unit 144.

The cam 163A is, for example, made of rubber and is an elliptical rotary cam in an X-Y plane. The center of the cam 163A in X-Y plane is coupled to the rotation shaft 162A1 of the electromagnetic actuator 162A. The cam 163A is fixed to the rotation shaft 162A1.

When the cam 163A is rotated by the electromagnetic actuator 162A and the minor axis side of the cam 163A is directed to the winding shaft 63A of the spool 63, the cam 163A does not contact the winding shaft 63A of the spool 63. By contrast, when the cam 163A is rotated by the electromagnetic actuator 162A and the major axis side thereof is directed to the winding shaft 63A of the spool 63, the cam 163A contacts the winding shaft 63A of the spool 63.

When the cam 163A comes into contact with the spool 63, the load at the time of rotation of the spool 63 becomes larger than in the case where the cam 163A is contactless with the spool 63. In this way, the torque changer 160A varies the load in rotation of the spool 63.

The cam 163A is brought into contact with the winding shaft 63A of the spool 63 in order to give a resistance to the rotational movement of the spool 63. The cam 163A made of rubber having a high friction coefficient is advantageous in providing a greater resistance force when the spool 63 rotates.

When the cam 163A is not in contact with the spool 63, the operating torque of the film advance lever 55 is light. By contrast, when the cam 163A is in contact with the spool 63, the operating torque of the film advance lever 55 is heavy.

Figure 19A:
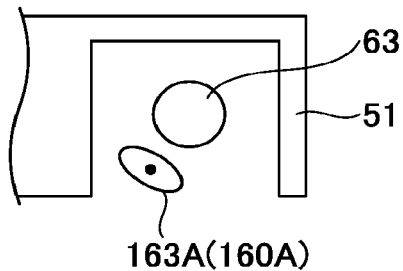
FIGS. 19A and 19B are diagrams illustrating operating states of a torque changer of the imaging device illustrated in FIG. 18.
Figure 19B:
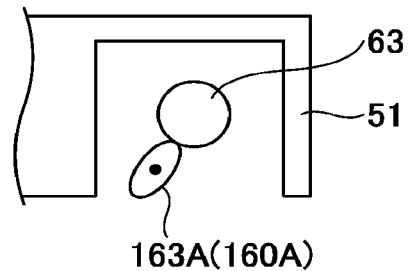

FIGS. 19A and 19B are diagrams illustrating operating states of the torque changer 160A. The torque changer 160A is controlled as follows. When the imaging device 100A is in the measurement mode, the cam 163A does not contact the spool 63 as illustrated in FIG. 19A, and the cam 163A contacts the spool 63 as illustrated in FIG. 19B in the image capturing mode.

The main control unit 141 of the controller 140 rotates the rotation shaft 162A1 of the electromagnetic actuator 162A so that the cam 163A is positioned at an angle not to contact the spool 63 as illustrated in FIG. 19A, when the mode selection unit 144 selects the measurement mode.

Further, the main control unit 141 of the controller 140 rotates the rotation shaft 162A1 of the electromagnetic actuator 162A so that the cam 163A is at an angle to contact the spool 63 as illustrated in FIG. 19B, when the mode selection unit 144 selects the measurement mode.

When the mode selection unit 144 switches from the measurement mode to the image capturing mode, the main control unit 141 rotates the rotation shaft 162A1 of the electromagnetic actuator 162A by 90 degrees clockwise in the X-Y plane. As a result, the cam 163A is rotated by 90 degrees.

When the cam 163A is not in contact with the spool 63, the force required for the user to operate the film advance lever 55 is small. That is, the reaction force at the time of operating the film advance lever 55 is small, and the film advance lever 55 can be operated with a small torque (operation torque of the film advance lever 55 alone).

On the other hand, when the cam 163A is in contact with the spool 63, the cam 163A gives a resistance force to the rotation of the spool 63, so that the reaction force in operating the film advance lever 55 is greater. Therefore, the user feels that the operating torque of the film advance lever 55 has increased.

As described above, in the state where the imaging device 100A is attached to the camera 50, the operating torque of the film advance lever 55 is different between the measurement mode and the image capturing mode. Therefore, the user can recognize the mode of the imaging device 100 depending on the operating torque of the film advance lever 55.

Further, in a state where the film cartridge 10 is in the camera 50, a larger force is required to operate the film advance lever 55 compared with a state where the film cartridge 10 is not loaded therein. That is, the user feels that the operating torque of the film advance lever 55 has increased.

Therefore, by causing the cam 163A to contact the spool 63 in the image capturing mode, the operating torque of the film advance lever 55 can be increased similar to when the film cartridge 10 is loaded, thereby providing the user with a realistic operation feeling as if the film cartridge 10 is loaded.

When the imaging device 100A is attached to the camera 50, the imaging device 100A is not visible from the outside of the camera 50. However, the torque in operating the film advance lever 55 changes, and the user can recognize whether the image capturing mode is selected based on the operation torque.

Figure 20A:
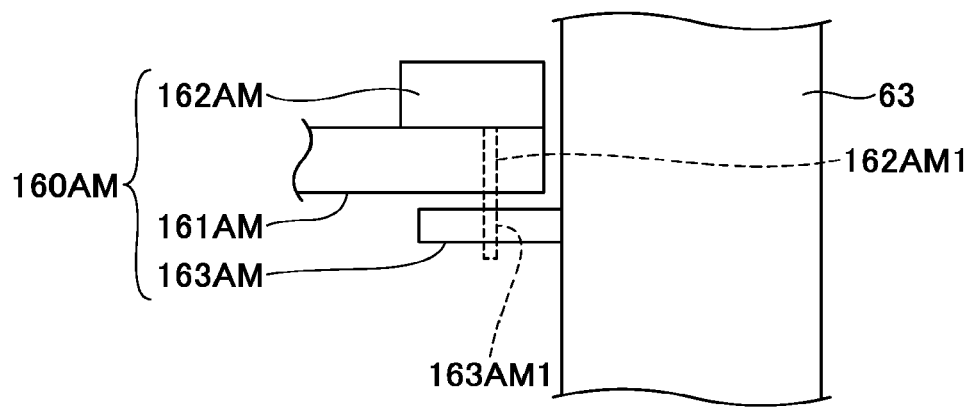
FIGS. 20A and 20B are diagrams illustrating a torque changer according to another modification.
Figure 20B:
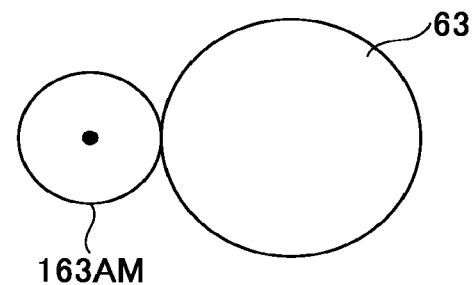

Further, instead of using the torque changer 160A, a configuration as illustrated in FIGS. 20A and 20B can be adopted. FIGS. 20A and 20B are diagrams illustrating a torque changer 160AM. The torque changer 160AM includes a support 161AM, a torque motor 162AM, and a rotator 163AM.

The support 161AM is on the plus-side face in the Y direction of the frame 110 and in the plus-side area in the X direction of the frame 110. The torque motor 162AM is mounted on the upper face of a tip side portion of the support 161AM.

The torque motor 162AM is capable of outputting a torque for applying a reverse phase brake to the rotation of the spool 63. Controlled by the main control unit 141 of the controller 140, the torque motor 162AM generates torque in a direction opposite to the rotation direction of a rotation shaft 162AM1. When torque is generated in the direction opposite to the rotating direction of the rotation shaft 162AM1, a resistance force can be applied to the rotation shaft 162AM1 to be braked.

The rotation shaft 162AM1 of the torque motor 162AM is passed through a through hole of the support 161AM and coupled to a rotation shaft 163AM1 of the rotator 163AM below the support 161AM.

The rotator 163AM is made of rubber and disc-shaped. The rotator 163AM is coupled to the rotation shaft 162AM1 of the torque motor 162AM to rotate about the rotation shaft 163AM1. The outer peripheral face of the rotator 163AM is in contact with the winding shaft 63A of the spool 63. The rotator 163AM is made of rubber in order to increase the friction coefficient with the winding shaft 63A of the spool 63. The cam 163A or the rotator 163AM is not necessarily made of rubber, but can be made of any material having a friction coefficient large enough to apply a rotational load to the spool 63 in accordance with the operation of the film advance lever 55.

By changing the torque generated by the torque motor 162AM between the measurement mode and the image capturing mode, the magnitude of the force required to operate the film advance lever 55 can be changed.

When the magnitude of the force required to operate the film advance lever 55 is changed between the measurement mode and the image capturing mode, the user can recognize the mode depending on the magnitude of the operation torque of the film advance lever 55.

For example, the torque applied to the rotation shaft 162AM1 by the torque motor 162AM in the measurement mode can be set to zero, and the torque motor 162AM can apply torque in the direction opposite to the rotational direction of the rotation shaft 162AM1 in the image capturing mode.

With this configuration, in the image capturing mode, the operating torque of the film advance lever 55 can be increased similar to when the film cartridge 10 is loaded, thereby providing the user with an operation feeling as if the film cartridge 10 is loaded.

Further, in the torque changer 160AM, the rotator 163AM is always in contact with the winding shaft 63A of the spool 63, and it is not necessary to change the position of the rotator 163AM relative to the spool 63. Therefore, the resistance can be applied to the rotation of the spool 63 with a simpler configuration.

The size of the camera 50 differs depending on camera type, and intervals between the rewinding fork 62, the shutter curtain 64, the shutter opening 64A, and the spool 63 in the X direction are different. Therefore, a configuration illustrated in FIG. 21 can be adopted.

Figure 21:
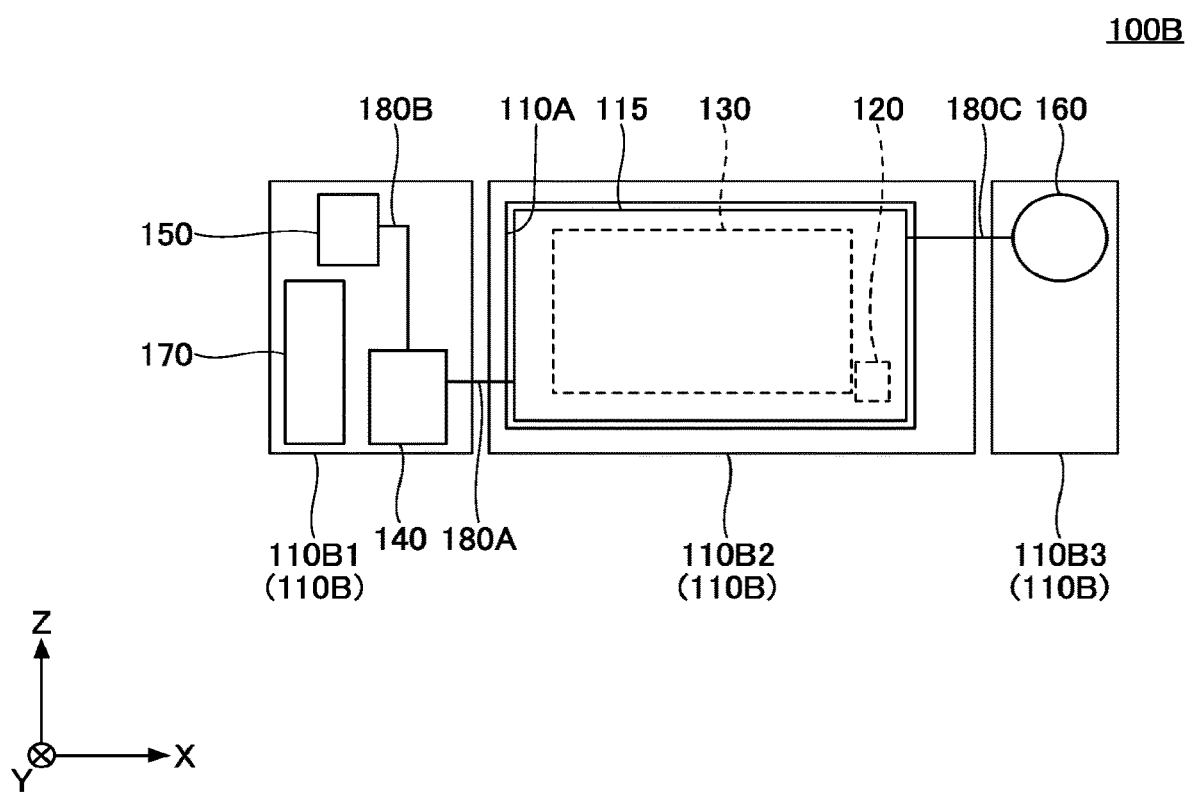
FIG. 21 is a diagram illustrating an imaging device according to another modification.

FIG. 21 is a diagram illustrating an imaging device 100B according to a modification of the above-described embodiment. In the imaging device 100B, the frame 110 of the imaging device 100 illustrated in FIGS. 3 to 5 is replaced with a split-type frame 110B.

The split-type frame 110B is divided into three frame parts 110B1, 110B2, and 110B3 in the X direction. Of the cables 180A and 180C, flexible cables can be used for the portions that straddle the frame parts 110B1, 110B2, and 110B3.

On the frame part 110B1, the controller 140, the displacement detector 150, and the battery 170 are mounted. On the frame part 110B2, the open-close detector 120 and the image sensor 130 are mounted. On the frame part 110B3, the sound output unit 160 is mounted.

The frame parts 110B1, 110B2, and 110B3 can be coupled by stays extending in the X direction, and the intervals between the frame parts 110B1, 110B2, and 110B3 in the X direction can be made adjustable. Further, instead of coupling with the stay extending in the X direction, the frame parts 110B1, 110B2, and 110B3 can be made slidable relative to each other in the X direction so that the intervals in the X-direction can be adjusted.

Use of the frame 110B enables adjustment of the interval between the frame part 110B1 and the frame part 110B2 in accordance with the distance from the cartridge chamber 61 to the shutter curtain 64 and the shutter opening 64A (the distance from the cartridge chamber 61 to the center of the lens 52 in X-Z plane view).

This structure further enables adjustment of the interval between the frame part 110B2 and the frame part 110B3 in accordance with the distance from the shutter curtain 64 and the shutter opening 64A to the spool 63 (the distance from the center of the lens 52 to the spool 63 in X-Z plane view).

Therefore, the frame 110B can be attached to various types of cameras 50.

The frame 110B can be a two-part type, and the frame parts 110B1 and 110B2 can be integral, or the frame parts 110B2 and 110B3 can be integral.

In the embodiments described above, the imaging device 100 includes the frame 110, the open-close detector 120, the image sensor 130, the controller 140, the displacement detector 150, the sound output unit 160, the battery 170, and the cables 180A, 180B, and 180C; and the mode of the imaging device 100 is switched to the measurement mode or the image capturing mode depending on the operation of the rewinding operation portion 56 and the like.

Focusing on the structural part of the imaging device 100, one feature of the imaging device 100 is that, when the rear lid 58 is closed, the imaging device 100 housed inside the camera body 51 is not visible from the outside of the camera 50, and the presence of the imaging device 100 is not known.

This feature provides an advantage that the structural part of the imaging device 100 can be attached to the existing camera 50 without impairing the external appearance of the camera 50.

With such a structural part of the imaging device 100, the imaging device 100 can be attached without impairing the external appearance of the existing camera 50.

The present disclosure provides the following aspects.

(Aspect 1)
An electronic device (e.g., the imaging device 100 from which the image sensor 130 is removed) that includes a frame (110) disposed in a space closed by a camera body (51) of a film camera (50) and a lid (e.g., the rear lid 58) of the film camera,
an open-close detector (120) that detects a state of an optical path open-close device (e.g., the shutter curtain 64) of the film camera,
a displacement detector (150) that detects a displacement of a movable portion (e.g., the rewinding fork 62) of the camera body to move into the space in conjunction with a movement of an operation portion (e.g., the rewinding operation portion 56) of the camera body.

(Aspect 2)
In the electronic device according to Aspect 1, the frame includes a flat plate-shaped first part (e.g., the frame base 111) and a second part (e.g., the support part 112) having a curvature. In the first part,
an optical-electrical conversion element (e.g., the image sensor 130) having an image capturing side is disposed, and, in the second part, the displacement detector is disposed.

The second part projects beyond the first part toward a subject captured by the electrical conversion element, and
the second part is on a right side of the optical-electrical conversion element when viewed from the image capturing side of the optical-electrical conversion element.

(Aspect 3)
The electronic device according to Aspect 2 further includes a notification device (e.g., the sound output unit 160), and the notification device is in a region of the frame on a side opposite the second part (e.g., the support part 112) with respect to the optical-electrical conversion element (e.g., the image sensor 130).

(Aspect 4)
An imaging device including the electronic device according to Aspect 1 and the optical-electrical conversion element.

(Aspect 5)
In the imaging device according to Aspect 4, the optical path open-close device is mechanical, and the frame includes a flat plate-shaped first part (e.g., the frame base 111) to be disposed, in the space, in a gap between at least the mechanical optical path open-close device and a pressure plate (58B).

On the first part, the open-close detector and the displacement detector are disposed.

(Aspect 6)
In the imaging device according to Aspect 4, the operation portion is a film advance lever to wind a film loaded in the camera,
the movable portion is a spool to wind the film, and
the displacement detector detects a displacement by rotation of the film advance lever.

(Aspect 7)
In the imaging device according to Aspect 4, the optical path open-close device is mechanical, the frame includes a flat plate-shaped first part (e.g., the frame base 111) to be disposed, in the space, in a gap between at least the mechanical optical path open-close device and a pressure plate (58B), and a second part (e.g., the support part 112) to be disposed in a cartridge chamber of the space.
The open-close detector is disposed in the first part, and
the displacement detector is disposed on the second part.

(Aspect 8)
In the imaging device according to Aspect 7, the operation portion is a rewinding operation portion (56) to rewind the film, and the movable portion is a rewinding fork. The rewinding fork moves to a first-side position in conjunction with pulling out of the rewinding operation portion from the camera body and moves to a second-side position in conjunction with pressing of the rewinding operation portion into the camera body.

The displacement detector is configured to detect a displacement of the rewinding fork to one of the first-side position and the second-side position of the rewinding fork.

(Aspect 9)
In the imaging device according to Aspect 8, the second part is shaped along a shape of the cartridge chamber and includes a tubular portion (e.g., the inward projecting portion 112D) to accommodate the rewinding fork and an opening (112D1) in a side wall of the tubular portion, and the displacement detector detects the displacement of the rewinding fork to the first-side position or the second-side position through the opening.

(Aspect 10)
In the imaging device according to Aspect 9, the tubular portion is on an upper side of the second part of the frame, the second part includes a projecting portion (112E) on a lower side opposite to the upper side, and the projecting portion projects downward.

A portion of the spool of the cartridge of the film cartridge includes a downward projecting portion projecting from a lower end of the cartridge, and the projecting portion is shaped along the downward projecting portion of the spool.

(Aspect 11)

In the imaging device according to Aspect 4, the movable portion is to rotate in conjunction with movement of the operation portion, and the imaging device further includes a torque changer that contacts the movable portion and changes a load of rotation of the movable portion, thereby changing a torque of the operation portion.

(Aspect 12)

In the imaging device according to aspect 11, the operation portion is a film advance lever to wind the film, the movable portion is a spool to wind the film, the torque changer contacts the spool and changes a load of rotation of the spool, thereby changing a torque of the film advance lever.

The descriptions above concern examples of the electronic device, the imaging device, and the imaging apparatus as embodiments of the present disclosure. However, the above-described embodiments are illustrative and do not limit the present invention. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An electronic device comprising:
an open-close detector configured to detect an open-close state indicating whether an optical path open-close device of a film camera is open or closed;
a displacement detector configured to detect a displacement of a movable portion of the film camera to generate a detection result, the movable portion interlocked with a movement of an operation portion of the film camera; and
control circuitry configured to:
in response to the detection result of the displacement detector, select a measurement mode for measuring an open time during which the optical path open-close device is open, from a plurality of operation modes of the electronic device; and
in the measurement mode, measure the open time based on the open-close state detected by the open-close detector.

2. An imaging device comprising:
the electronic device according to claim 1; and
an optical-electrical conversion element.

3. An imaging apparatus comprising:
the imaging device according to claim 2; and
a camera body including the optical path open-close device, the movable portion, and the operation portion,
wherein the control circuitry is configured to set an image capturing condition for acquiring an electronic image via the optical path open-close device, based on the open time measured in the measurement mode.

4. The imaging apparatus according to claim 3,
wherein the image capturing condition is an exposure time for acquiring the electronic image, and
wherein the control circuitry is configured to set the exposure time to the measured open time.

5. The imaging apparatus according to claim 3,
wherein the displacement detector includes:
a signal output element configured to output a signal; and
a signal receiving element configured to receive the signal, and
wherein the displacement detector is configured to detect the displacement of the movable portion based on a receiving state of the signal by the signal receiving element, the receiving state changing with a positional change of the movable portion.

6. The imaging apparatus according to claim 5,
wherein the control circuitry is configured to select the measurement mode in response to the detection result that indicates a displacement of the movable portion toward a first side of the movable portion or a second side opposite the first side.

7. The imaging apparatus according to claim 3,
wherein the displacement detector is configured to detect a displacement by rotation of the movable portion.

8. The imaging apparatus according to claim 7,
wherein the control circuitry is configured to select the measurement mode in response to the detection result that indicates a displacement of the movable portion in a predetermined rotation direction.

9. The imaging apparatus according to claim 3,
wherein the displacement detector is coupled to the movable portion, to receive pressure with a movement of the movable portion, and configured to detect the displacement of the movable portion based on a change in pressure from the movable portion.

10. The imaging apparatus according to claim 9,
wherein the control circuitry is configured to select the measurement mode in response to the detection result generated according to an increase or a decrease in the pressure.

11. The imaging apparatus according to claim 3,
wherein the operation portion is one of a rewinding operation portion configured to rewind a film mounted in the camera body and a winding operation portion configured to wind the film.

12. The imaging apparatus according to claim 3, further comprising a mode information output device configured to output mode information indicating the operation mode selected by the control circuitry.

13. The imaging apparatus according to claim 12,
wherein the mode information output device is configured to output a sound wave indicating the mode information.

14. The imaging apparatus according to claim 12,
wherein the mode information output device is configured to output a vibration indicating the mode information.

15. The imaging apparatus according to claim 3,
wherein the operation portion is a winding operation portion configured to wind a film mounted in the camera body, and
wherein the imaging apparatus further includes a torque changer configured to change an operating torque of the winding operating portion in accordance with the operation mode selected by the control circuitry.

16. An imaging apparatus comprising:
the imaging device according to claim 2; and
a mode information output device configured to output mode information indicating the operation mode selected by the control circuitry,
wherein the mode information output device is configured to output a sound wave indicating the mode information.

17. An imaging apparatus comprising:
the imaging device according to claim 2; and
a mode information output device configured to output mode information indicating the operation mode selected by the control circuitry,
wherein the mode information output device is configured to output a vibration indicating the mode information.

* * * * *